US012592808B1

(12) United States Patent
Rangel-Ruiz et al.

(10) Patent No.: US 12,592,808 B1
(45) Date of Patent: Mar. 31, 2026

(54) ANTENNA APERTURE SHARING ARCHITECTURES FOR SIMULTANEOUS TRANSMISSION AND RECEPTION OF WIRELESS POWER AND BROADBAND DATA

(71) Applicant: NoiseFigure Research, Inc, Lubbock, TX (US)

(72) Inventors: Carlos Rangel-Ruiz, Renton, WA (US); Jerry Lopez, Renton, WA (US); Alexander William Boothby, Renton, WA (US)

(73) Assignee: NoiseFigure Research, Inc, Lubbock, TX (US)

( * ) Notice: Subject to any disclaimer, the term of this patent is extended or adjusted under 35 U.S.C. 154(b) by 0 days.

(21) Appl. No.: 19/323,613

(22) Filed: Sep. 9, 2025

Related U.S. Application Data

(60) Provisional application No. 63/801,771, filed on May 7, 2025.

(51) Int. Cl.
　　H04W 4/00 (2018.01)
　　H04L 1/1829 (2023.01)
　　　　　　(Continued)

(52) U.S. Cl.
　　CPC .......... H04L 5/0098 (2013.01); H04L 1/1861 (2013.01); H04L 25/028 (2013.01)

(58) Field of Classification Search
　　CPC .... H04L 5/0098; H04L 1/1861; H04L 25/028
　　See application file for complete search history.

(56) References Cited

U.S. PATENT DOCUMENTS

| 775,337 | A | 11/1904 | Landell |
| 1,449,382 | A | 3/1923 | Carson |

(Continued)

OTHER PUBLICATIONS

Carrick et al., Design and Application of a Hilbert Transformer in a Digital Receiver, Proceedings of the SDR 11 Technical Conference and Product Exposition, Wireless Innovation Forum, Chantilly, VA, 7 pages, dated 2011.

(Continued)

*Primary Examiner* — Omoniyi Obayanju
(74) *Attorney, Agent, or Firm* — FP; André Grouwstra; Sikander M. Khan

(57) ABSTRACT

A transmitter system comprises a mapper configured to map data bits and power information to multiple subcarriers, producing mapped information. A first-level modulator converts this mapped information into subcarrier specifications, each defined by a complex number indicating amplitude and phase. The system includes multiple data stream/power channel digital paths, each with a frequency selector that processes a portion of the subcarrier specifications. An orthogonal subcarrier generator translates these specifications from frequency to time domain, generating baseband real and imaginary signals. A second-level modulator processes these signals with intermediate-frequency sine and cosine waves to produce IF I and IF Q signals. A beamformer modifies the phase and/or amplitude of these signals across multiple antenna channels, creating directed signals. Finally, a combiner adds output signals from each data stream/power channel digital path, directing them to corresponding antenna channel modules, facilitating efficient transmission across multiple channels.

23 Claims, 19 Drawing Sheets

(51) Int. Cl.
H04L 5/00 (2006.01)
H04L 25/02 (2006.01)

(56) References Cited

U.S. PATENT DOCUMENTS

| | | | |
|---|---|---|---|
| 11,057,249 B1 | 7/2021 | Hawkes | |
| 12,003,350 B1 | 6/2024 | McCormick et al. | |
| 2006/0274852 A1 | 12/2006 | Trachewsky et al. | |
| 2012/0182895 A1 | 7/2012 | Jwa | |
| 2012/0274154 A1* | 11/2012 | DeLuca | H02J 50/40 |
| | | | 307/149 |
| 2012/0327830 A1 | 12/2012 | Hamaguchi et al. | |
| 2014/0341048 A1 | 11/2014 | Sajadieh et al. | |
| 2017/0077972 A1 | 3/2017 | Lu | |
| 2017/0180178 A1 | 6/2017 | Gollakota et al. | |
| 2025/0100722 A1* | 3/2025 | Son | B60L 53/12 |

OTHER PUBLICATIONS

ETSI, Digital Video Broadcasting (DVB); Framing structure, channel coding and modulation for digital terrestrial television European Broadcasting Union Union Européenne de Radio-Télévision EBU, dated Jan. 2009, 66 pages.
Matthew S. Gast, 802.11ac: A Survival Guide, O'Reilly Publication, published on Jul. 23, 2013, 154 pages.
S. Lawrence Marple, Computing the Discrete-Time 'Analytic' Signal Via FFT, IEEE Transactions on Signal Processing (47)(9), dated Sep. 30, 1999, 4 pages.
Steven A. Tretter, Chapter 7 Single-Sideband Modulation and Frequency Translation, University of Maryland, dated 2003, 33 pages.

* cited by examiner

110

112

Data →

Power info →

Mapper 410 → Mapped info / 2N → First-level modulator 420 → Subcarrier specs / 2N → Subcarrier generator 430

114

BB Re/Im          2

441

IF sin/cos          Directional info

DSB IF I/Q

Second-level modulator 440 → Beam former 460

Dir I/Q          2M_a

113

113          115

Power

RF 470          480

DAC

Data →

Power info →

Mapper 410

Mapped info
2N

First-level modulator 420

Subcarrier specs
2N

Subcarrier generator 430

114

BB Re/Im                    2

441

IF sin/cos

DSB IF I/Q

SSB IF I/Q

Directional info

Second-level modulator 440

SSB prep 450

Beam former 460

Dir I/Q                    $2M_a$

113

113

115

Power —

RF 470          480

DAC          ⊗

DSB IF I

1464

DSB IF Q

1160

1420

SSB IF I

SSB IF Q

1460

450

1501

1120

DSB IF I

1464

DSB IF Q

1160

1420

SSB IF I

SSB IF Q

1460

1060

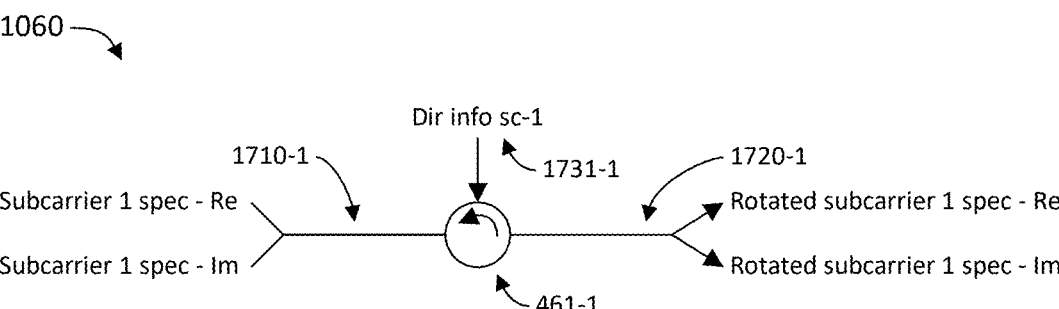

Dir info sc-1

1710-1

1731-1

1720-1

Subcarrier 1 spec - Re

Subcarrier 1 spec - Im

Rotated subcarrier 1 spec - Re

Rotated subcarrier 1 spec - Im 461-1

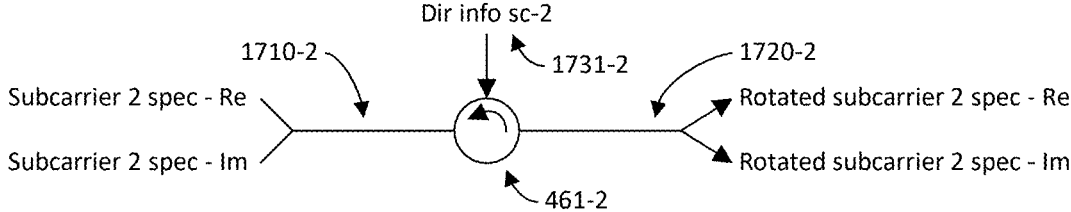

Dir info sc-2

1710-2

1731-2

1720-2

Subcarrier 2 spec - Re

Subcarrier 2 spec - Im

Rotated subcarrier 2 spec - Re

Rotated subcarrier 2 spec - Im 461-2

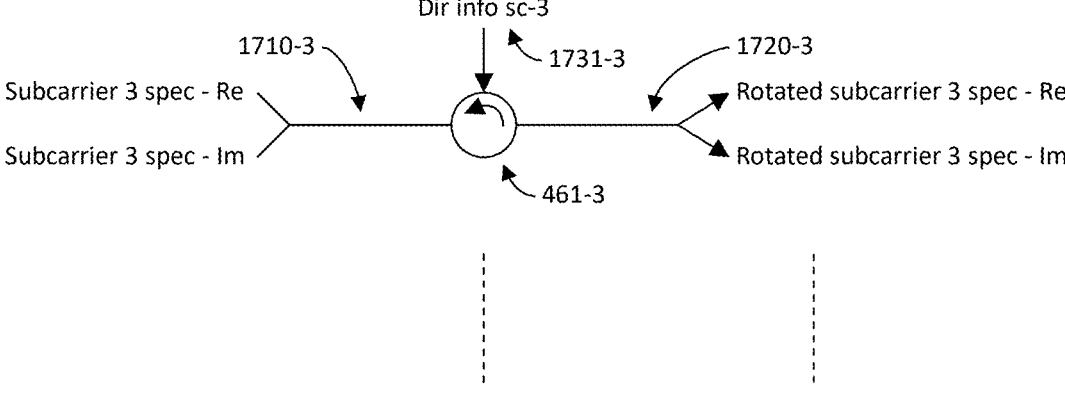

Dir info sc-3

1710-3

1731-3

1720-3

Subcarrier 3 spec - Re

Subcarrier 3 spec - Im

Rotated subcarrier 3 spec - Re

Rotated subcarrier 3 spec - Im 461-3

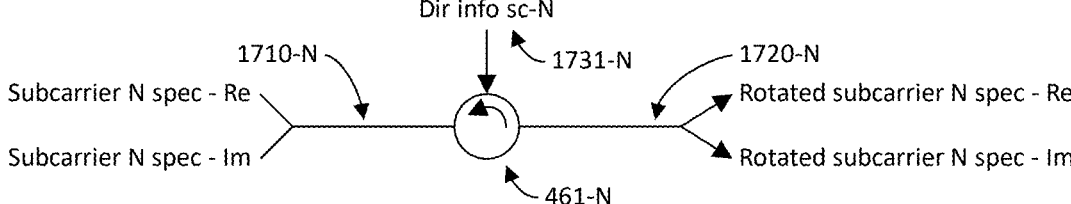

Dir info sc-N

1710-N

1731-N

1720-N

Subcarrier N spec - Re

Subcarrier N spec - Im

Rotated subcarrier N spec - Re

Rotated subcarrier N spec - Im

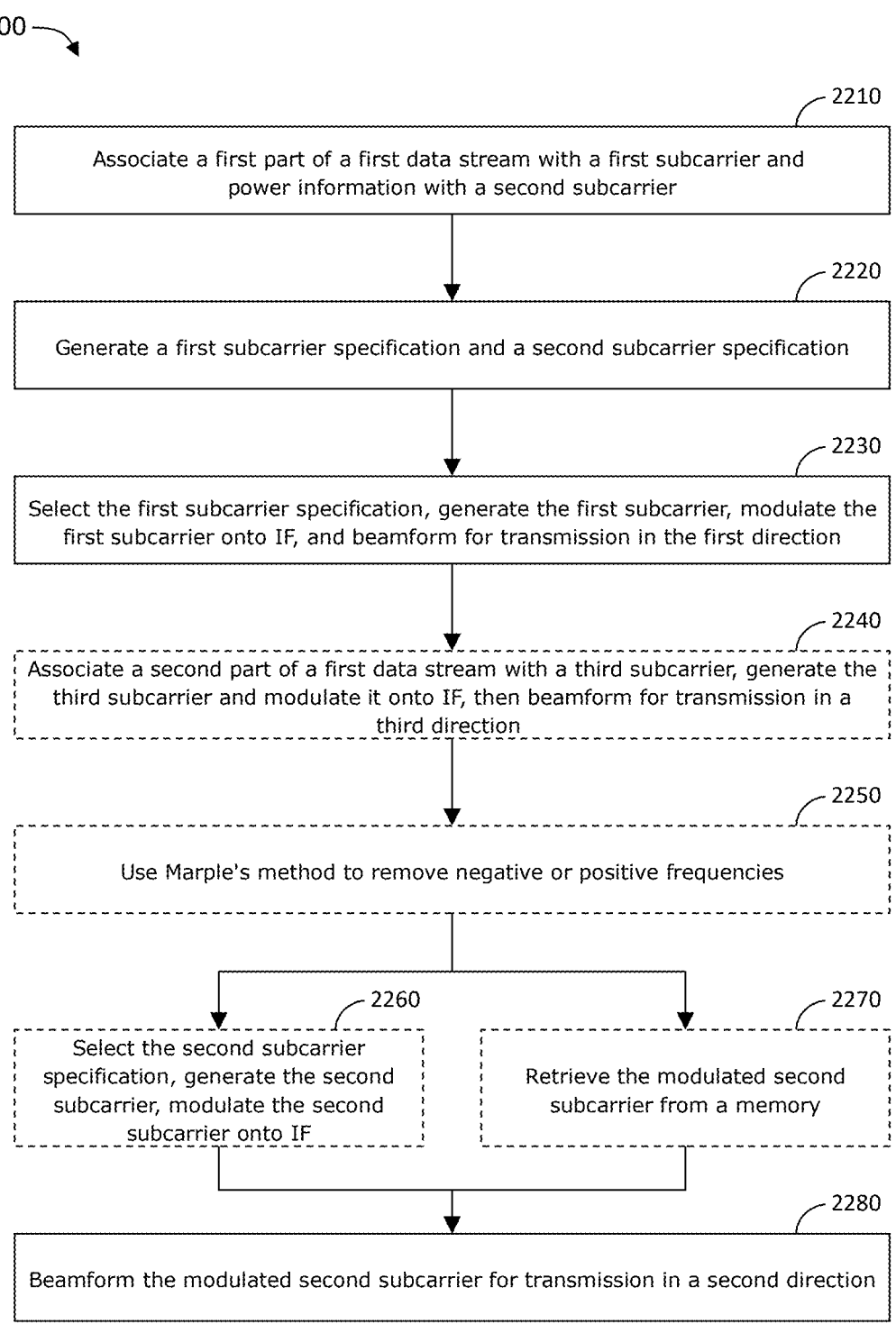

2200

2210

Associate a first part of a first data stream with a first subcarrier and power information with a second subcarrier

2220

Generate a first subcarrier specification and a second subcarrier specification

2230

Select the first subcarrier specification, generate the first subcarrier, modulate the first subcarrier onto IF, and beamform for transmission in the first direction

2240

Associate a second part of a first data stream with a third subcarrier, generate the third subcarrier and modulate it onto IF, then beamform for transmission in a third direction

2250

Use Marple's method to remove negative or positive frequencies

2260

Select the second subcarrier specification, generate the second subcarrier, modulate the second subcarrier onto IF

2270

Retrieve the modulated second subcarrier from a memory

2280

Beamform the modulated second subcarrier for transmission in a second direction

FIG. 22

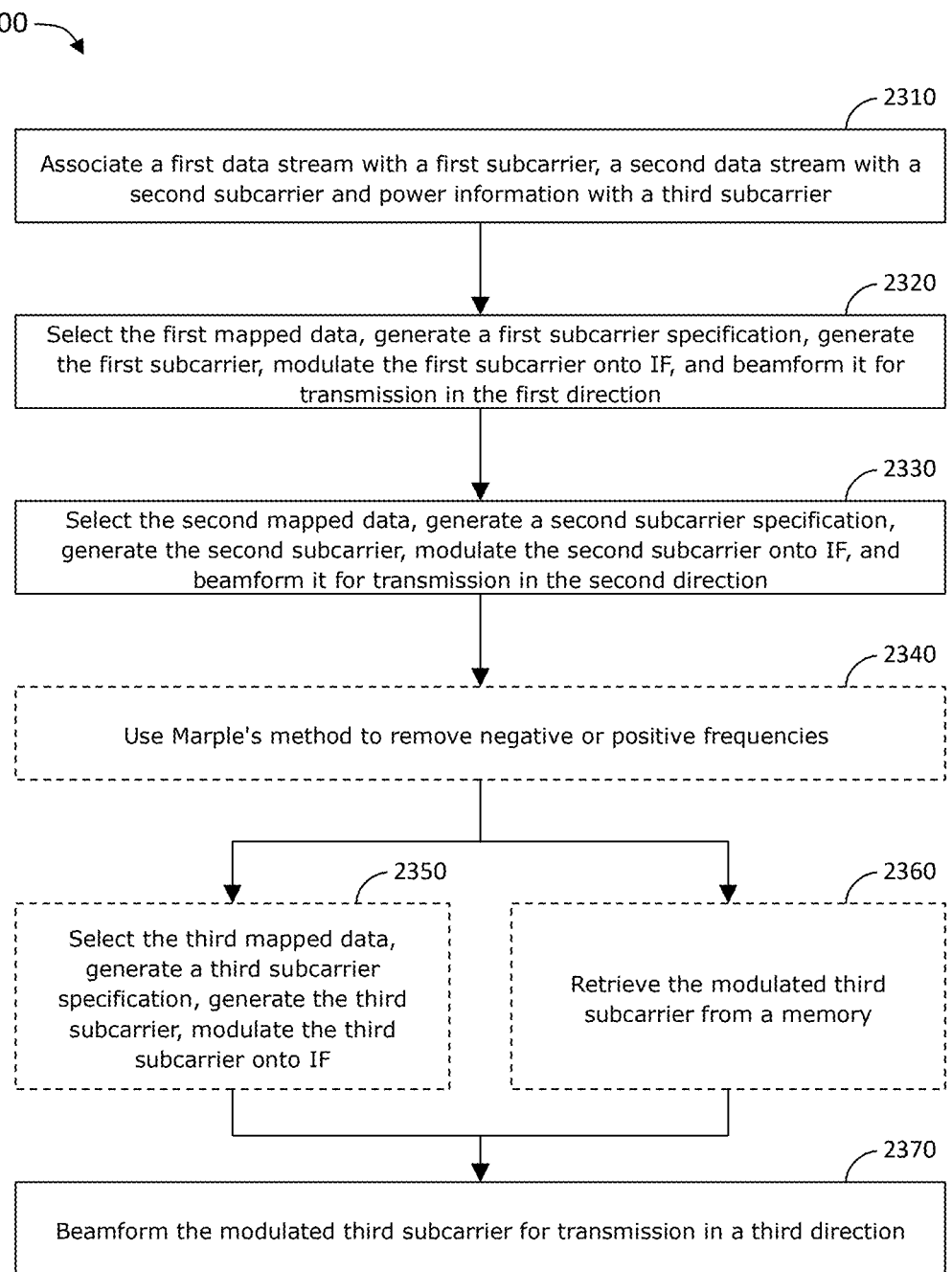

2300

2310
Associate a first data stream with a first subcarrier, a second data stream with a second subcarrier and power information with a third subcarrier 2320
Select the first mapped data, generate a first subcarrier specification, generate the first subcarrier, modulate the first subcarrier onto IF, and beamform it for transmission in the first direction 2330
Select the second mapped data, generate a second subcarrier specification, generate the second subcarrier, modulate the second subcarrier onto IF, and beamform it for transmission in the second direction 2340
Use Marple's method to remove negative or positive frequencies 2350
Select the third mapped data, generate a third subcarrier specification, generate the third subcarrier, modulate the third subcarrier onto IF 2360
Retrieve the modulated third subcarrier from a memory 2370
Beamform the modulated third subcarrier for transmission in a third direction

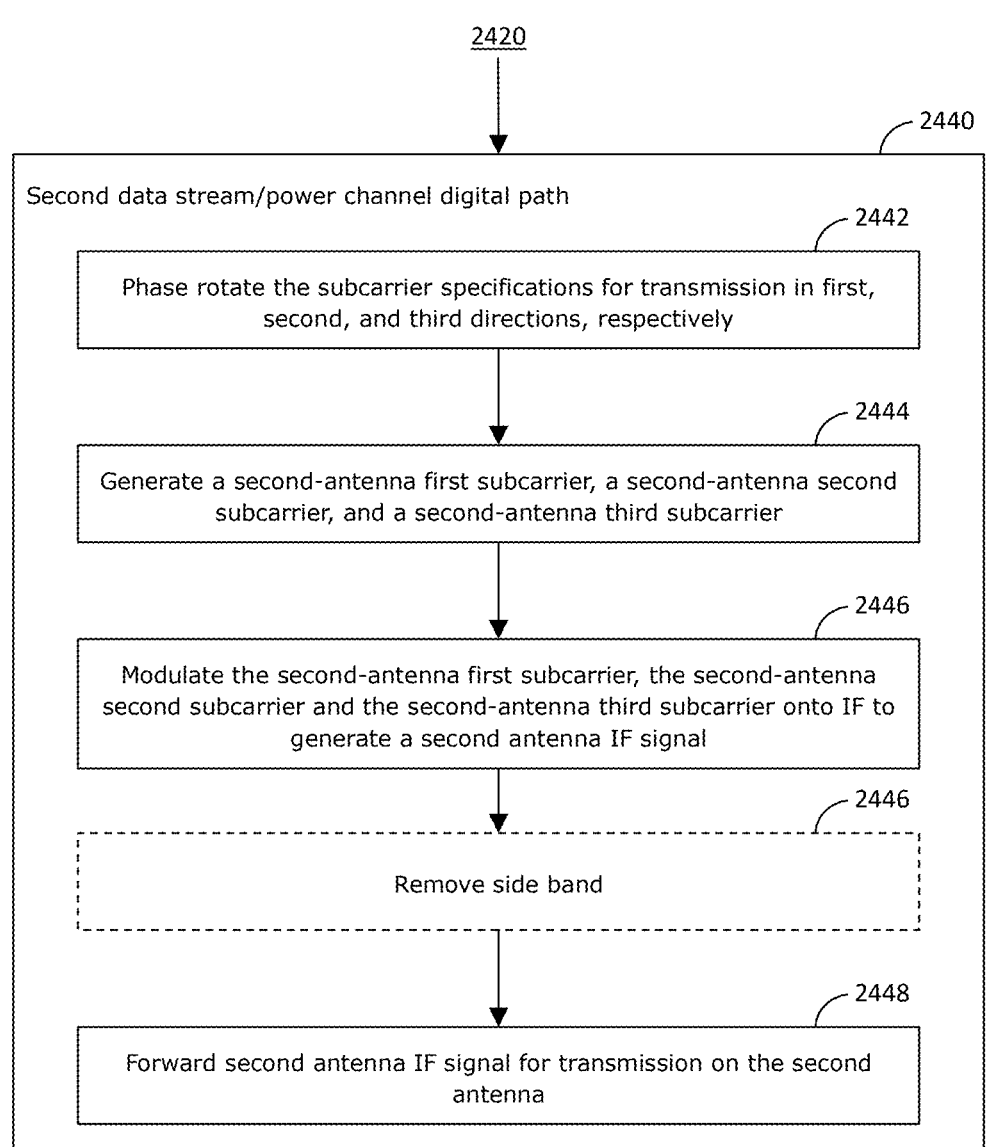

2420

2440

Second data stream/power channel digital path

2442

Phase rotate the subcarrier specifications for transmission in first, second, and third directions, respectively

2444

Generate a second-antenna first subcarrier, a second-antenna second subcarrier, and a second-antenna third subcarrier

2446

Modulate the second-antenna first subcarrier, the second-antenna second subcarrier and the second-antenna third subcarrier onto IF to generate a second antenna IF signal

2446

Remove side band

2448

Forward second antenna IF signal for transmission on the second antenna

FIG. 24 (continued)

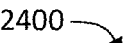

2400

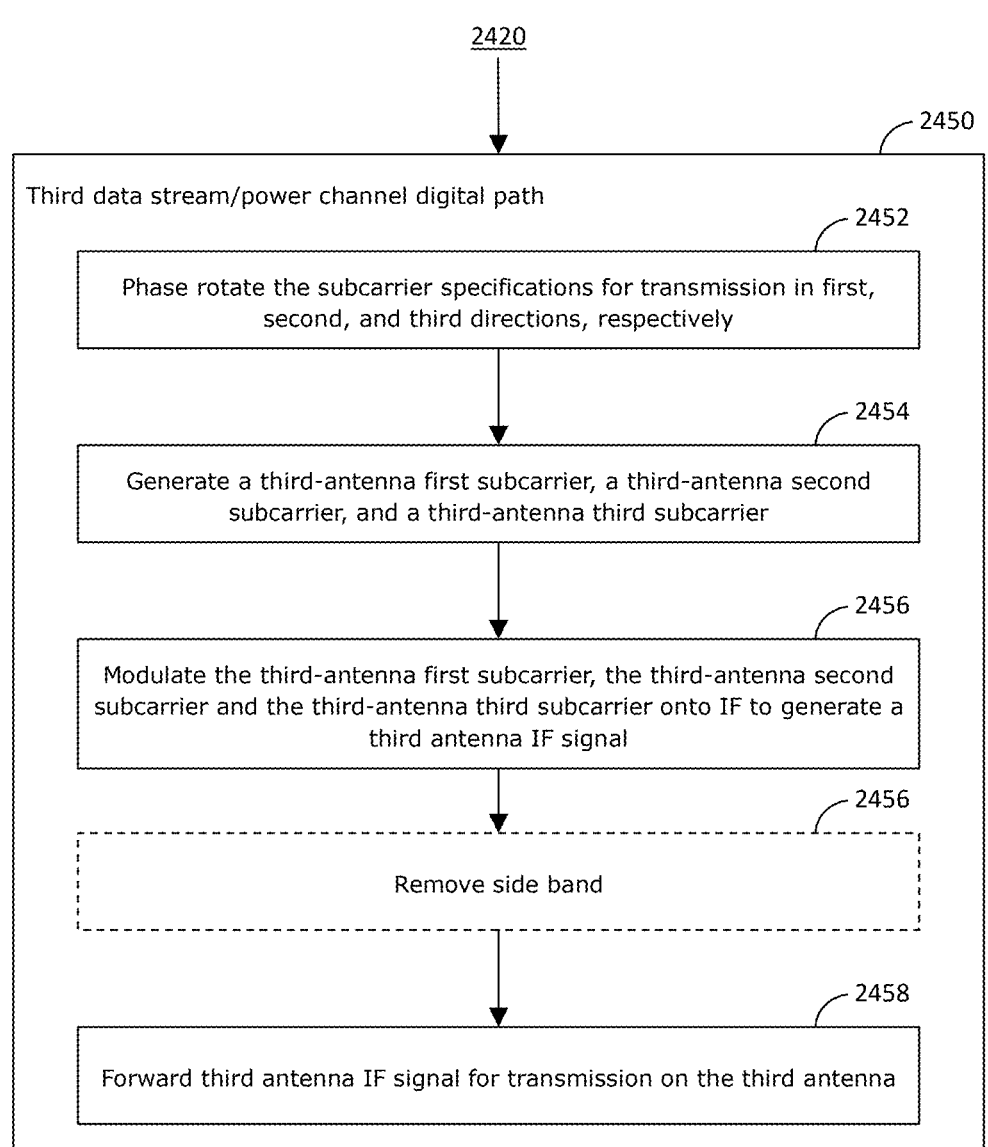

2420

2450

Third data stream/power channel digital path

2452

Phase rotate the subcarrier specifications for transmission in first, second, and third directions, respectively

2454

Generate a third-antenna first subcarrier, a third-antenna second subcarrier, and a third-antenna third subcarrier

2456

Modulate the third-antenna first subcarrier, the third-antenna second subcarrier and the third-antenna third subcarrier onto IF to generate a third antenna IF signal

2456

Remove side band

2458

Forward third antenna IF signal for transmission on the third antenna

FIG. 24 (continued)

ANTENNA APERTURE SHARING ARCHITECTURES FOR SIMULTANEOUS TRANSMISSION AND RECEPTION OF WIRELESS POWER AND BROADBAND DATA

REFERENCES

This application claims priority of U.S. provisional patent application Ser. No. 63/801,771, filed on May 7, 2025, and entitled "Antenna Aperture Sharing Architectures for Simultaneous Transmission and Reception of Wireless Power and Broadband Data."

This application is related to:

U.S. patent application Ser. No. 18/907,906, entitled "Systems and Methods for Directed Transmission and Reception of Wireless Power and Broadband Data", filed on Oct. 7, 2024, and issued as U.S. Pat. No. 12,284,064 on Apr. 22, 2025;

U.S. patent application Ser. No. 19/087,508, entitled "A Transmitter for Wireless Power and Broadband Data," filed on Mar. 22, 2025; and U.S. patent application Ser. No. 19/196,726, entitled "A Receiver for Wireless Power and Broadband Data," filed on May 2, 2025, and allowed on Jun. 25, 2025.

The priority and related patent applications and all other documents referred to in this patent application are hereby included by reference as if set forth in full.

BACKGROUND

Technical Field

The disclosed implementations relate generally to systems and methods used in the simultaneous wireless transmission and reception of power and data.

Context

Wireless transmission of power has seen increased interest over the last decade. Data is transmitted in ever increasing bandwidths. Existing solutions for the simultaneous transmission of power and broadband data have suffered from interference of the data by the power.

BRIEF DESCRIPTION OF THE DRAWINGS

The technology will be described with reference to the drawings, in which:

In FIG. 5, the architecture of FIG. 4 includes an SSB prep unit in the digital path to allow for efficient digital SSB removal, also previously disclosed. Using an SSB prep unit may enable more consistency and better power efficiency than using RF filters applied after the RF power amplifiers of individual antenna channel modules.

FIG. 17 illustrates an example of a set of phase rotators 1060.

3

FIG. 22 illustrates an example method 2200 for simultaneously transmitting broadband data and wireless power in multiple directions.

FIG. 23 illustrates an example method 2300 for simultaneously transmitting broadband data and wireless power in multiple directions and with multiple modulation types.

Figure 24:
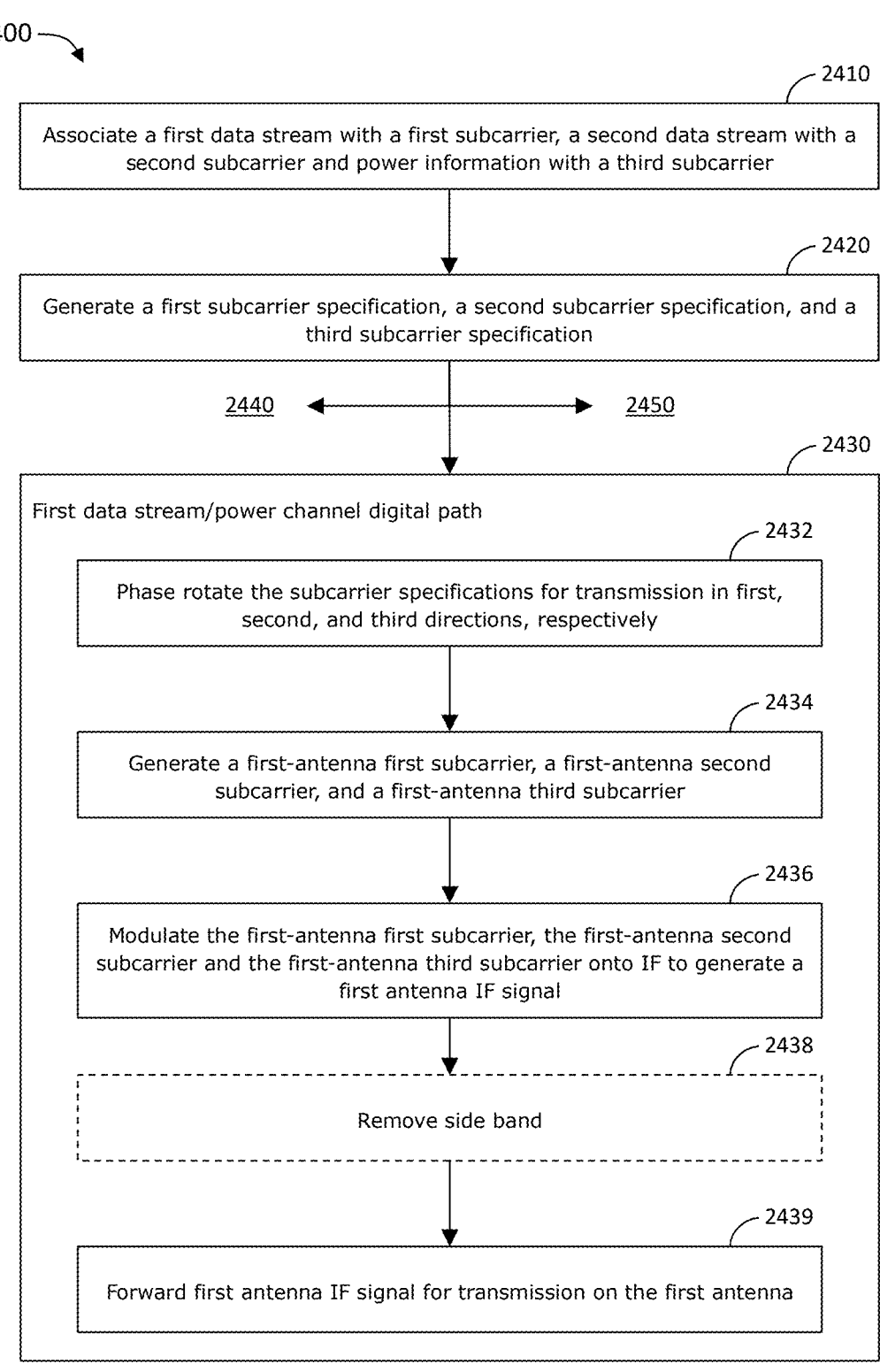

FIG. 24 illustrates an example method 2400 for simultaneously transmitting multiple data streams and wireless power in multiple directions from any number of antennas.

In the figures, similar reference numbers may indicate functionally similar elements. The systems and methods illustrated in the figures—and described in the Detailed Description below—may be arranged and designed in a wide variety of different implementations. Neither the figures nor the Detailed Description are intended to limit the scope as claimed. Instead, they merely represent examples of different implementations.

DETAILED DESCRIPTION

Researchers have developed and tested many systems for the wireless transfer of energy along with broadband data. Wireless transmission of digital data has been practiced for many decades, and data transfer bandwidths continue to increase with the availability of ever higher frequency bands in the radio spectrum. With the advent of 6G and 7G transmission systems, and radio spectra above 60 GHz, very high bandwidths may become available. For example, data bits may have a bandwidth of more than one hundred megabits per second (100 Mbps) or even more than six gigabits per second (6 Gbps). The associated emitted signals may occupy a spectrum of at least ten megahertz (10 MHz) or even greater than two gigahertz (2 GHz), respectively. For the sake of efficiency, especially when a signal needs to transfer both data and energy, beamforming is important. However, conventional systems have suffered from interference of the power with the data. This problem was solved by the inventors, and described in U.S. patent application Ser. No. 18/907,906, 19/087,508, and 19/196,726.

Conventionally, if two data streams had to be sent in two different directions, each data stream would be assigned to a separate section in an antenna arrangement or, if the same antennas were to be used, widely distant frequencies to prevent interference. Implementations described herein may use all antennas in an arrangement, or sub-antennas in a phased array antenna, to transmit all data streams, and indeed there can be more data streams (more beams) than antennas. Additionally, frequencies can be spaced very tightly and the bandwidth can be modified instantaneously for each beam, as required by a user's transmission priorities.

This patent document describes how in an arrangement of $M_a$ antennas, $M_d$ data streams can be simultaneously transmitted (or received) in (or from) up to $M_d$ directions. Transmitter implementations may use an N-points frequency-to-time conversion (such as an inverse fast Fourier transform (IFFT)), where $N \geq M_d$. Receiver implementations may use an N-points time-to-frequency conversion, such as a fast Fourier transform (FFT).

Terminology

As used herein, the phrase "one of" should be interpreted to mean exactly one of the listed items. For example, the phrase "one of A, B, and C" should be interpreted to mean any of: only A, only B, or only C.

As used herein, the phrases "at least one of" and "one or more of" should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives "first", "second", "third", etc., to describe an object merely refers to different instances or classes of the object and does not imply any ranking or sequence.

The terms "comprising" and "consisting" have different meanings in this patent document. An apparatus, method, or product "comprising" (or "including") certain features includes those features but does not exclude the presence of other features. On the other hand, if the apparatus, method, or product "consists of" or "contains" certain features, the presence of any additional features is excluded.

The term "coupled" is used in an operational sense and is not limited to a direct or an indirect coupling. "Coupled to" is generally used in the sense of directly coupled, whereas "coupled with" is generally used in the sense of directly or indirectly coupled. Coupled in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term "connected" is used to indicate a direct connection, such as electrical, optical, electromagnetic, or mechanical, between the things that are connected, without any intervening things or devices.

The term "configured" to perform a task or tasks is a broad recitation of structure generally meaning having circuitry that performs the task or tasks during operation. As such, the described item can be configured to perform the task even when the unit/circuit/component is not currently on or active. In general, the circuitry that forms the structure corresponding to configured to may include hardware circuits, and may further be controlled by switches, fuses, bond wires, metal masks, firmware, and/or software. Similarly, various items may be described as performing a task or tasks, for convenience in the description. Such descriptions should be interpreted as including the phrase configured to.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B". This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase based on is thus synonymous with the phrase based at least in part on.

The terms "substantially", "close", "approximately", "near", and "about" refer to being within minus or plus 10% of an indicated value, unless explicitly specified otherwise.

The following terms or acronyms used herein are defined at least in part as follows:

"Antenna arrangement"—an arrangement of one or more antennas, for example a phased array antenna that includes two or more sub-antennas. Antennas or sub-antennas in an antenna arrangement may be active or passive. Antenna arrangements with two or more active antennas or sub-antennas may be able to change directivity dynamically.

"Aperture"—a surface, near or on an antenna or arrangement of antennas, on which calculations or measurements are made of transmitted or received electromagnetic field strengths.

"ASIC"—application-specific integrated circuit

"BB"—baseband

"CGRA"-coarse-grained reconfigurable architecture

"CMOS transistor"—complementary metal-oxide-semiconductor transistor

"DAC"—digital-to-analog converter

"DCT"—discrete cosine transform

"DFT"—discrete Fourier transform

"DSB"—double sideband

"FET"—field-effect transistor

"FFT"—fast Fourier transform

"FPGA"—field-programmable gate array

"GAAFET"—gate all-around FET

"HBT"—heterojunction bipolar transistor

"IC"—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

"IDCT"—inverse discrete cosine transform

"IDFT"—inverse discrete Fourier transform

"IFFT"—inverse fast Fourier transform

"IF"—intermediate frequency

"IFFT"—inverse fast Fourier transform

"JFET"—junction FET

"LDPC"—low-density parity check

"Marple's method"—a method of removing negative frequency components from a signal, as described in "Computing the discrete-time 'analytic' signal via FFT," by S. L. Marple Jr, IEEE Transactions on Signal Processing, Volume 47, September 1999.

"MCM"—multi-chip module

"MESFET"—metal-semiconductor field-effect transistor

"Metadata"—data about other data, about a configuration, about a transmission, or containing identifying information "MOS transistor"—metal-oxide-semiconductor transistor "NMOS transistor"—n-type MOS transistor "OFDM"—orthogonal frequency division multiplexing. A technology that modulates data on multiple closely spaced subcarriers that are orthogonal to each other.

"PAM"—pulse amplitude modulation

"PCB"—printed circuit board

"Phased array antenna"—for the purposes of this patent document, a phased array antenna is any collection of sub-antennas transmitting or receiving signals that are phase-related to each other. In some cases, the sub-antennas are arranged in a regular array in one, two, or three dimensions.

"PMOS transistor"—p-type MOS transistor

"QAM"—quadrature amplitude modulation

"QPSK"—quad phase shift keying

"RF"—radio frequency

"SSB"—single sideband

Implementations

Figure 1:
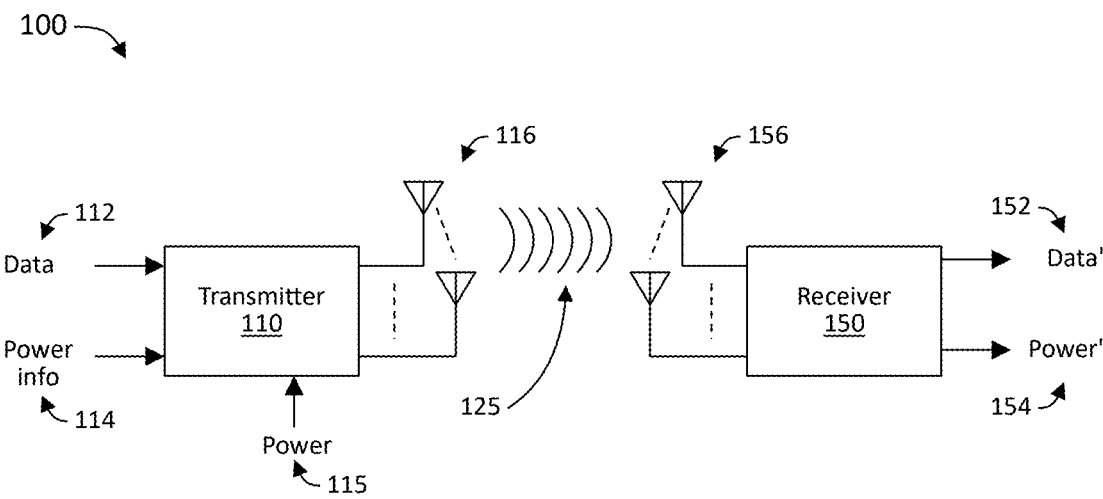
FIG. 1 illustrates an example system with a transmitter with spatial directivity and a receiver. The system is capable of wirelessly transferring broadband data and power from the transmitter to the receiver.

FIG. 1 illustrates an example system 100 with a transmitter 110 with spatial directivity and a receiver 150. The system is capable of wirelessly transferring broadband data 112 and at least a part of power 115 from the transmitter 110 to the receiver 150. Transmitter 110 receives data 112 and power information 114. It processes the data 112 to be transmitted and the power information 114 that specifies how power 115 is to be transmitted via, for example, antenna arrangement 116 and electromagnetic beam 125 to receiver 150. Receiver 150, which may also have a phased array antenna or antenna arrangement with multiple antennas, receives electromagnetic beam 125, decodes its signals and harvests (at least a part of) its power, to recreate recovered data 152 and deliver harvested power 154. In a robust implementation and under adequate transmission and reception conditions, recovered data 152 equals data 112 close to 100% of the time and harvested power 154 is a reasonable portion of power 115. Adequate transmission and reception conditions may include a line-of-sight between antenna arrangement 116 and antenna arrangement 156, sufficiently favorable atmospheric conditions, and a distance between antenna arrangement 116 and antenna arrangement 156 that allows harvesting a sufficient part of the transmitted power 115 and high-quality recovery of the transmitted data 112.

Figure 2:
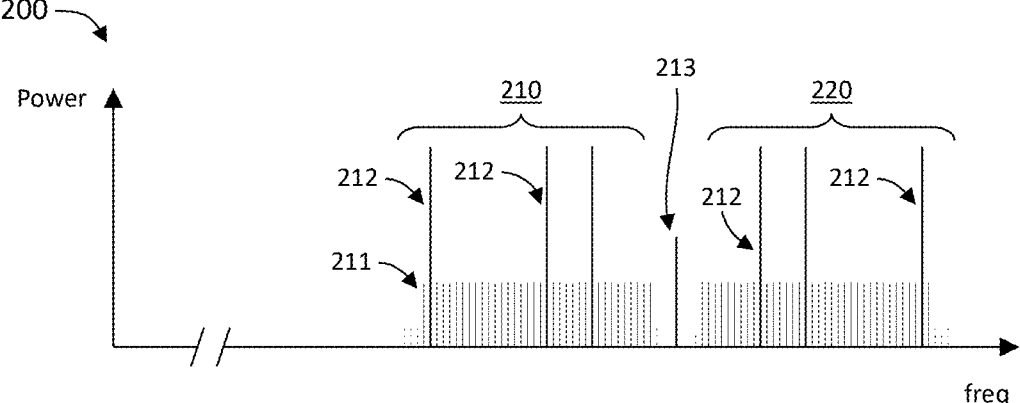
FIG. 2 illustrates an example double-sideband (DSB) spectrum that the transmitter may emit towards one or more receivers.

FIG. 2 illustrates an example double-sideband (DSB) spectrum 200 that the transmitter may emit towards one or more units of receiver 150. Spectrum 200 includes a lower sideband 210 and an upper sideband 220 located around a radio frequency carrier (RF carrier 213). Both lower sideband 210 and upper sideband 220 include up to N subcarriers, including data subcarriers 211 and one or more power subcarriers 212, where N is at least 2. Upper sideband 220 carries an OFDM (or similar) spectrum with all encoded information, and lower sideband 210 carries the same OFDM (or similar) spectrum, mirrored versus RF carrier 213. An implementation may suppress RF carrier 213, for example when it does not use RF carrier 213 for the transmission of power. In some implementations, power subcarriers 212 may have a constant (relatively high) amplitude, i.e., they are select-tone continuous waveforms, whereas data subcarriers 211 may have a relatively low average amplitude, and a temporary amplitude that depends on the data being transmitted. In other implementations, power subcarriers 212 may have any amplitude, for example based on the needs of an individual recipient or group of recipients. In yet other applications, a power subcarrier 212 may be modulated with data and/or metadata. In typical OFDM systems, data carriers have a flat spectrum, because data is randomized to reduce channel disturbances and to provide encryption. Another factor adding to the spectrum's flatness is the removal, as much as possible, of redundancy in the data itself. However, OFDM and similar systems may add redundancy to combat channel noise, and to enable detection and correction of transmission errors.

An implementation may generate the OFDM (or similar) spectrum in various ways. A digital implementation may specify the phase and amplitude (or real and imaginary components) of each subcarrier and use an inverse discrete Fourier transform (IDFT) or an inverse fast Fourier transform (IFFT) to translate signals from the frequency domain to the time domain and calculate a real and an imaginary time series with the baseband (BB) version of the spectrum of upper sideband 220. An analog implementation may use a reference frequency as an input to a bank of phase locked loops, each of which creates one of the subcarriers. With current technologies, digital implementations are far less costly and have the advantage that they can be designed to any required mathematical precision. An implementation may use any transform that can generate a signal in the time domain based on a definition in the frequency or similar domain, and vice versa. Examples include the Fourier transform, DFT/IDFT, FFT/IFFT, discrete cosine transform (DCT/IDCT), Laplace transform, wavelet transform, and any other orthogonal transform from a first domain to a second domain, for example from the frequency domain to the time domain. Because of its present low cost of manufacture and use, examples in this document may show FFT and IFFT implementations, even though other implementations are possible and within the ambit and scope of the description and claims in this document.

DSB amplitude modulation (AM) radio has been demonstrated as early as 1899 (see https://en.wikipedia.org/wiki/Amplitude_modulation and U.S. Pat. No. 775,337, "Wireless Telephone," Roberto Landell de Moura, filed Oct. 4, 1901, issued Nov. 22, 1904) and is still practiced today. However, a disadvantage of DSB AM transmission is its low spectral efficiency, which is never above 50%. This disadvantage was known and understood a long time ago, leading to the development of single-sideband (SSB) radio systems (U.S. Pat. No. 1,449,382 John Carson/AT&T, "Method and Means for Signaling with High Frequency Waves" filed on Dec. 1, 1915; granted on Mar. 27, 1923).

Figure 3:
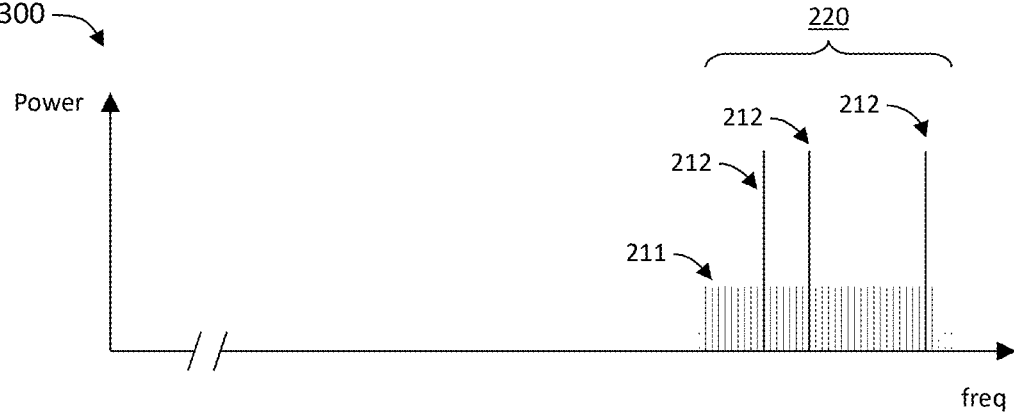
FIG. 3 illustrates an example single-sideband (SSB) radio spectrum that the transmitter may emit towards one or more receivers.

FIG. 3 illustrates an example SSB spectrum 300 that the transmitter may emit towards one or more units of receiver 150. This example shows upper sideband 220, whereas lower sideband 210 has been suppressed, along with RF carrier 213. In a typical implementation, most of the subcarriers are used for data, and one or more subcarriers are used for power. Some other carriers may be used as pilot subcarriers to help receiver 150 achieve time and frequency synchronization, and further subcarriers may be used for transmission of metadata. On the outsides of each sideband may be a number of guard subcarriers (here drawn as short dotted lines). These are unused subcarriers with zero (or close to zero) amplitude, which help guard against adjacent channel interference. For example, a WiFi IEEE 802.11a OFDM symbol may have 64 subcarriers, including 48 for data, 4 for pilots, and 12 guard subcarriers, most of which are at the outsides of the sidebands. The symbol may have a duration of 3.2 μs, to which a cyclic guard interval of 0.8 μs is prepended to guard against multipath (i.e., inter-symbol) interference.

For an N-point IFFT, spectrum 300 can include up to N subcarriers, including data subcarriers 211 and one or more power subcarriers 212. This example shows a first, second, and third power subcarrier, but other implementations may have any other number of power subcarriers 212. Power subcarriers 212 may have a different amplitude than data subcarriers 211, for example a higher amplitude. Although in FIG. 3 all power subcarriers are drawn with the same amplitude, in some implementations the amplitude of the power subcarriers varies. For example, the amplitude of a power subcarrier for a nearby recipient may be smaller than the amplitude of the power carrier for a faraway client. Spectrum 300 may also include pilot carriers (not separately drawn), which may be at a different amplitude (for example, lower) than data subcarriers 211. An implementation may also not use all available subcarriers. For example, to reduce interference with other signals in adjacent frequency bands, an implementation may not use some of the outer subcarriers.

Figure 4:
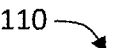
FIG. 4 illustrates a previously disclosed example architecture of the transmitter for directed transmission of power and broadband data. In this implementation, an orthogonal frequency-division multiplexed spectrum (an OFDM spectrum) may be quadrature modulated on an intermediate frequency (IF) by a second-level modulator, and separate beams are formed for separate antenna channel modules each driving an antenna, for example a sub-antenna in a phased array antenna. An optional RF filter can remove a sideband to enable SSB transmission.

FIG. 4 illustrates an example architecture of transmitter 110 for directed transmission of power and broadband data, previously disclosed in U.S. Pat. No. 12,284,064. In this implementation, an OFDM spectrum or similar may be quadrature modulated on an intermediate frequency by a second-level modulator 440, and separate beams are formed for separate antenna channel modules each driving an antenna arrangement 116. A unit 441 is coupled with the orthogonal subcarrier generator 430 and includes second-level modulator 440 and beamformer 460, as drawn. In an alternative implementation, unit 441 includes up to N phase rotators and up to N second-level modulators 440, where N is the number of frequencies in the frequency-to-time conversion in orthogonal subcarrier generator 430.

Transmitter 110 receives data 112 (and may separate data 112 in data blocks called frames, each frame to be transmitted during one OFDM symbol) and power information 114. Data 112 may have been compressed for efficiency and encrypted for security. It may include separate messages or streams for separate destinations, each of which may have an individual receiver 150. DSB transmission simplifies the architecture needed for transmission and the architecture needed for reception of the data. Whereas DSB transmission uses twice the bandwidth of SSB transmission for the same amount of data, in some applications this may be acceptable. An optional RF filter 480 in (or after) each antenna channel module 113 can remove a sideband to enable SSB transmission. RF filter 480 may be coupled between the mixer and the power amplifier, or between the power amplifier and the antenna, or between the DAC 2210 and the mixer.

Data 112 and power information 114 enter mapper 410, whose function is to map data bits in data 112 and metadata in power information 114 to up to N individual subcarriers in the multi-carrier frequency spectrum to be transmitted. Although a subcarrier may be modulated with as little as one bit, more generally a subcarrier is modulated with any complex number, so N subcarriers can code up to N real numbers and N imaginary numbers. Mapper 410 may further define the function and appearance of subcarriers for other uses, such as pilot subcarriers and guard subcarriers. Mapper 410 may also perform other functions such as adding redundancy to the data to allow for error detection and correction, interleaving data bits over non-adjacent subcarriers to combat fixed-frequency interferences, redistributing data bits over time to combat burst interferences such as may be caused by lighting, and convolutional coding or LDPC coding to ease demodulation. Mapper 410 outputs mapped information, i.e. information for every subcarrier for the duration of the OFDM symbol. Mapper 410 may work in a customized way, or according to a standardized communications protocol, such as IEEE802.11 or any other protocol.

The first-level modulator 420 receives the mapped information and converts the mapped information to subcarrier specifications. The subcarrier specifications may include complex numbers that each define a real and an imaginary component of a subcarrier. For data subcarriers 211, the subcarrier specification is based on the data bits to be transmitted and on the implemented and/or selected modulation scheme, which may be any modulation scheme known in the art, including binary phase shift keying (BPSK), quadrature phase shift keying (QPSK), M-ary phase shift keying (M-ary PSK), quadrature amplitude modulation (QAM, e.g., QAM16, QAM64, QAM256, etc.), pulse-amplitude modulation (PAM), etc.

First-level modulator 420 works in tandem with orthogonal subcarrier generator 430, which receives the subcarrier specifications, and generates and sums the subcarriers resulting in a baseband real signal (the BB Re signal) and a baseband imaginary signal (the BB Im signal). Orthogonal subcarrier generator 430 outputs these as waveforms (if analog) or as a time-domain series of N successive Re and Im values (if digital) that includes the up to N subcarriers. Orthogonal subcarrier generator 430 may implement an N-point inverse Fourier transform, an N-point IDFT, an N-point IFFT, an N-point IDCT, or any other orthogonal frequency-to-time (or similar) transform.

The second-level modulator 440 multiplies the BB Re signal with a sine wave of an intermediate frequency (IF) and the BB Im signal with a cosine wave of the intermediate frequency. The multiplications result in amplitude modulation of the BB Re signal into a (DSB) IF I signal and of the BB Im signal into a (DSB) IF Q signal. Thus, second-level modulator 440 modulates the multiple subcarriers onto the real and imaginary components of a single IF carrier.

For example, 63 of the 64 subcarriers of an IEEE 802.11a signal are defined as located symmetrically around the zero frequency at a spacing of 0.3125 MHz between-10 MHz and +10 MHz. However, the subcarriers are not modulated symmetrically, so that a 64-point IFFT outputs both 64 real time samples (the BB Re signal) and 64 imaginary time samples (the BB Im signal). Amplitude modulation of the BB Re signal and the BB Im signal, for example with a 25 MHz IF signal in second-level modulator 440, translates the subcarriers to a band from 15 to 35 MHz. Technically, this is a double sideband signal, but the sidebands do not contain the same information because the subcarriers are modulated asymmetrically. However, the amplitude modulation also results in frequency components in the band from −15 to −35 MHz. These components are symmetrical to the frequency components in the band from +15 to +35 MHz.

Beamformer 460 receives the IF I signal and the IF Q signal, and directional information for each of $M_a$ sub-antennas in antenna arrangement 116, and modifies the phase and amplitude of the IF I signal and the IF Q signal for the up to $M_a$ channels that feed antenna arrangement 116. It may do so, for example, by multiplying the IF I signal and the IF Q signal with a first complex number for the first antenna channel module 113, with a second complex number for the second antenna channel module 113, with a third complex number for the third antenna channel module 113, and so on. Thus, beamformer 460 outputs $M_a$ directed IF I/Q signals, i.e., the results of the up to $M_a$ complex multiplications of the IF I and Q signals with the $M_a$ separate complex numbers for the $M_a$ antenna channel modules 113 that feed antenna arrangement 116, where the $M_a$ separate complex numbers define the directivity of antenna arrangement 116 for the final RF transmission frequency. However, at this stage the signals are still at the intermediate frequency. $M_a$ units of RF backend 470 take the $M_a$ directed IF I and Q signals, upconvert them to the final RF transmission frequency, combine them into M directed complex RF signals, and provide power amplification to power the $M_a$ (sub-)antennas in antenna arrangement 116. The signal is a DSB signal, but it may be prepared for single-sideband transmission, for example using RF filters 480, or as described with reference to FIG. 5.

Figure 5:
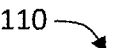
FIG. 5 illustrates an example architecture of a transmitter for single sideband (SSB) directed transmission of power and broadband data.

FIG. 5 illustrates an example architecture of transmitter 110 for single sideband (SSB) directed transmission of power and broadband data, previously disclosed in U.S. Pat. No. 12,284,064. In FIG. 5, the implementation of FIG. 4 further includes an SSB prep unit 450 in the digital path to allow for efficient digital SSB removal. Using an SSB prep unit may enable more consistency and better power efficiency than using RF filters 480 applied after the RF power amplifiers of individual antenna channel modules 113. SSB prep unit 450 is located between second-level modulator 440 and beamformer 460. SSB prep unit 450 is configured to prepare the IF I/Q signal for RF frequency translation resulting in an SSB signal.

In some implementations, the first SSB prep unit 450 is implemented in an integrated circuit (IC) using dedicated logic and/or a digital signal processor (DSP).

Figure 6:
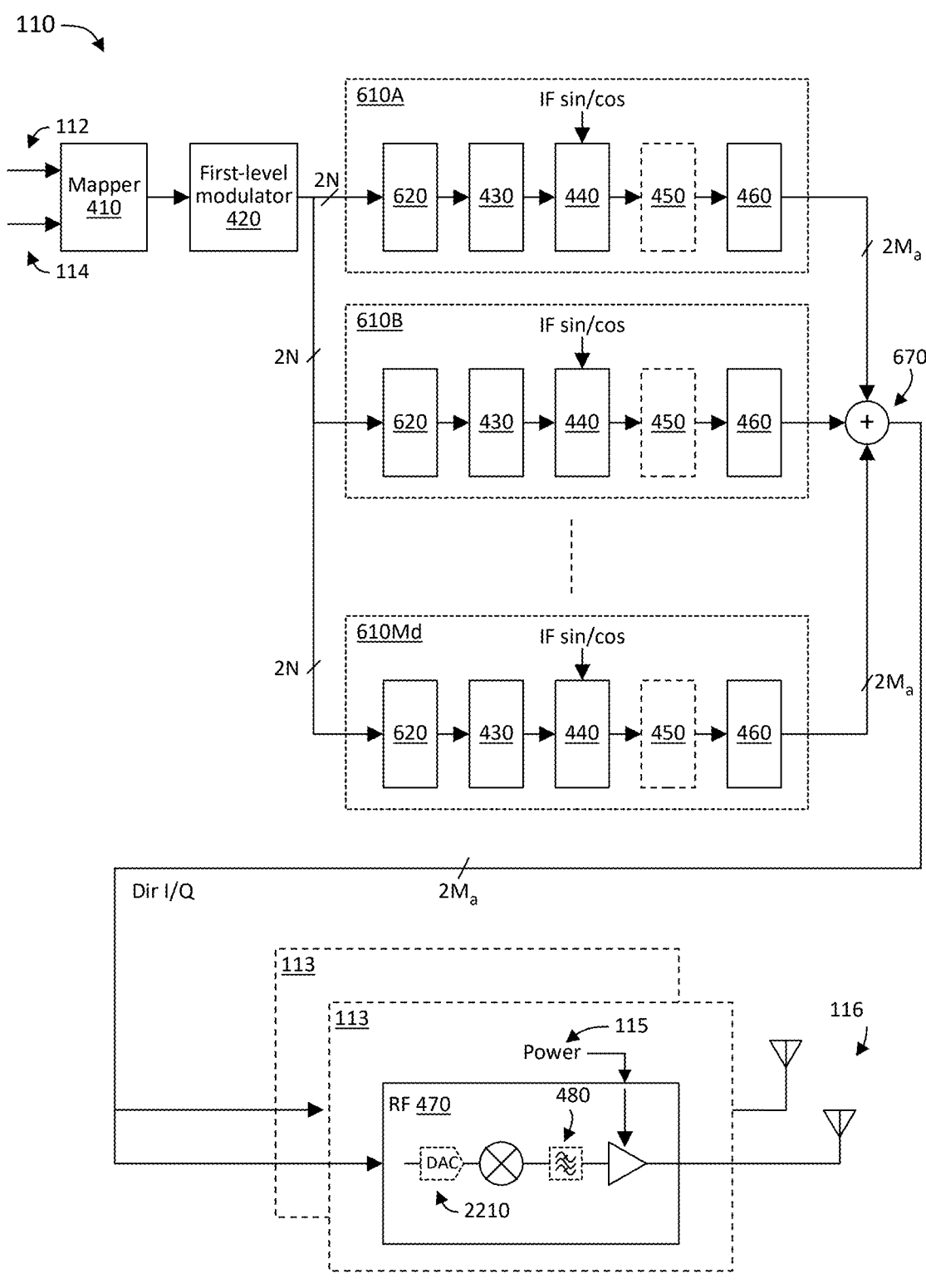
FIG. 6 illustrates an example architecture that can simultaneously transmit data and/or power in multiple directions.

FIG. 6 illustrates an example architecture of transmitter 110 that can transmit data and/or power in $M_d$ directions. This architecture can transmit $M_d$ individually controllable beams. $M_d$ can be larger than the number of (sub) antennas $M_a$. The architecture includes functional blocks described with reference to FIGS. 4-5. It can create and direct $M_d$ independent beams since it uses $M_d$ beamformers 460. Each beam may include a separate data stream or wireless power channel. A first part of the subcarrier specifications from first-level modulator 420 is used in a first data stream/power channel digital path 610A and a second part of the subcarrier specifications is used in a second data stream/power channel digital path 610B, etc. In the extreme case, each active subcarrier carries one of $M_d$ data streams and wireless power channels. Thus, $M_d \leq N_a$, wherein $N_a$ equals the number of broadband data subcarriers and wireless power subcarriers specified to orthogonal subcarrier generator 430 and converted to N complex values in time. Each data stream/power channel digital path 610A-$M_d$ includes a frequency selector 620 that selects a part of the subcarriers to be transmitted in a specified direction; an orthogonal subcarrier generator 430; a second-level modulator 440; optionally an SSB prep unit 450; and a beamformer 460. Each beamformer 460 delivers M directed IF signals that include the part of the subcarriers to be transmitted in the specified direction.

In some implementations, first-level modulator 420 may use a single type of modulation (for example, BPSK, QPSK, QAM, etc.) for all subcarriers, and in other implementations first-level modulator 420 uses different types of modulation for different groups of subcarriers.

A combiner 670 adds the $M_a$ signals ($2M_a$ numbers) from beamformers 460 resulting in $M_a$ directed IF I/Q signals for the $M_a$ units of RF backend 470 in $M_a$ antenna channel modules 113. Depending on whether an implementation includes SSB prep unit 450, these signals may include single or double sidebands.

Implementations use all available antennas for all data streams and wireless power channels. This provides the highest directivity in steering data and power. It further provides the possibility to scale power in, for example, data stream/power channel digital path 610B to a larger value without requiring an increased resolution of the circuits in data stream/power channel digital path 610A, provided that the $M_a$ units of RF backend 470 can handle the required larger dynamic range. To scale wireless power, an implementation may steer multiple wireless power carrying subcarriers in the same direction; or it may simply scale the signal in a single data stream/power channel digital path 610, for example, at the input of its beamformer 460.

Some implementations combine one or more electronic circuits of data stream/power channel digital paths 610A-$M_d$, for example by time-multiplexing their input and output signals and using the electronic circuits at increased speed.

Figure 7:
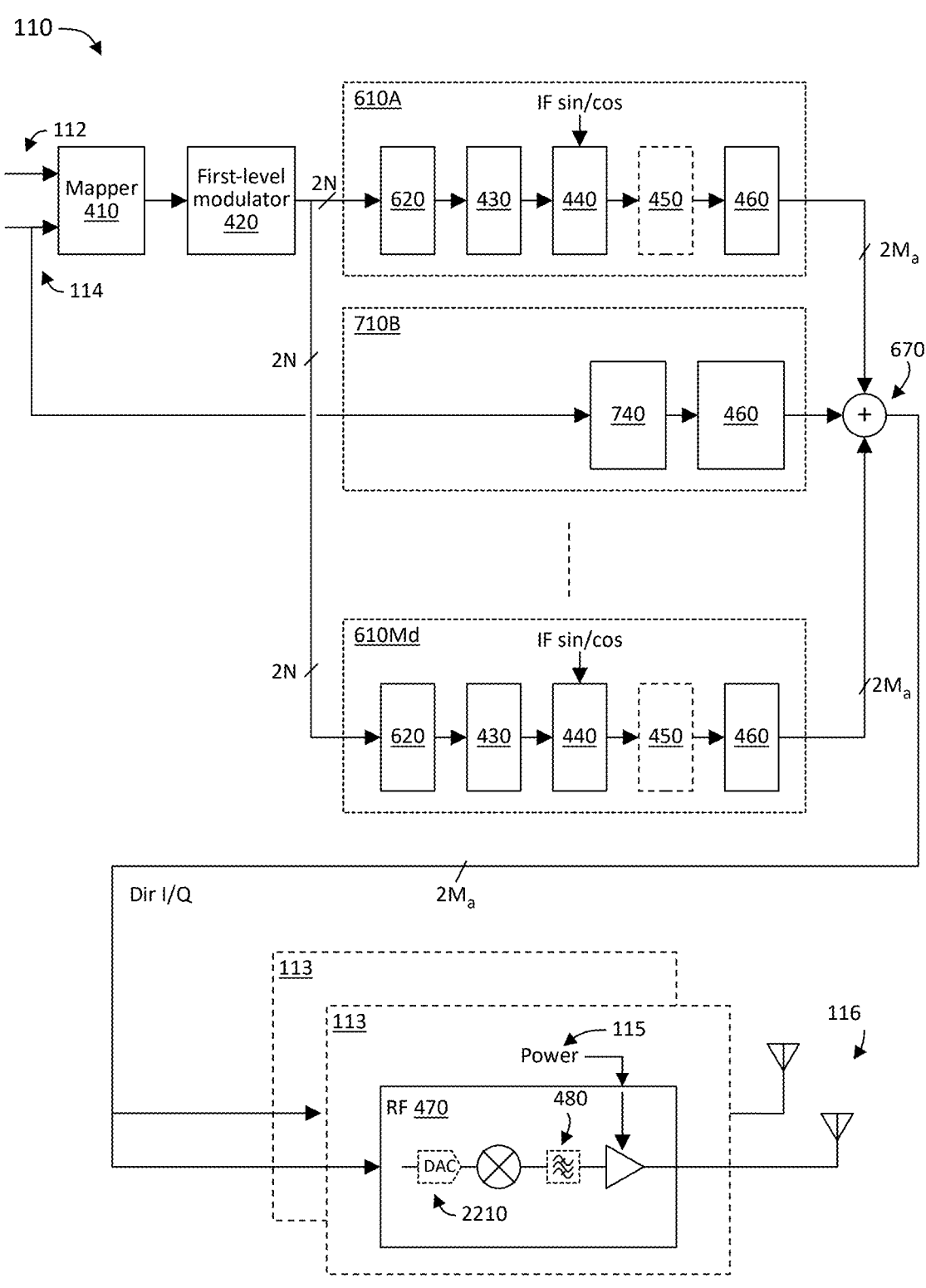
FIG. 7 illustrates an example of how directional power transmission can be simplified to reduce silicon real estate.

FIG. 7 illustrates an example of how directional power transmission can be simplified to reduce silicon real estate. Like the architecture in FIG. 6, this example architecture of transmitter 110 can simultaneously transmit data and/or power in multiple directions. Blocks in common with FIG. 6 share the functionality described with reference to FIGS. 4-6. However, instead of (for example) second data stream/ power channel digital path 610B, FIG. 7 has second path 710B that includes a memory 740 and beamformer 460. Power subcarriers, and other subcarriers that have the same information or content in successive OFDM symbols, don't need to be regenerated for every OFDM frame. Instead, they can be calculated or generated once and stored in memory 740. The memory can be read once per symbol, its content serving as input data for the coupled beamformer 460. Thus, the content of memory 740 may equal the output data that the coupled second-level modulator 440 or SSB prep unit 450 in data stream/power channel digital path 610B in FIG. 6 would have produced. Memory 740 may be a read-only memory (ROM), a non-volatile memory (NVM), a serial or cyclical memory, or a random-access memory (RAM). Its content may be hardwired (ROM), preconfigured (NVM), entered from an external source via power information 114, or generated by data stream/power channel digital path 610A, for example during a system startup cycle prior to transmission.

Implementations may include any number $M_d$ of paths (up to $N_a$). Thus, regardless of the number $M_a$ of antennas and antenna channel modules 113, antenna arrangement 116 can transmit any number of beams.

Figure 8:
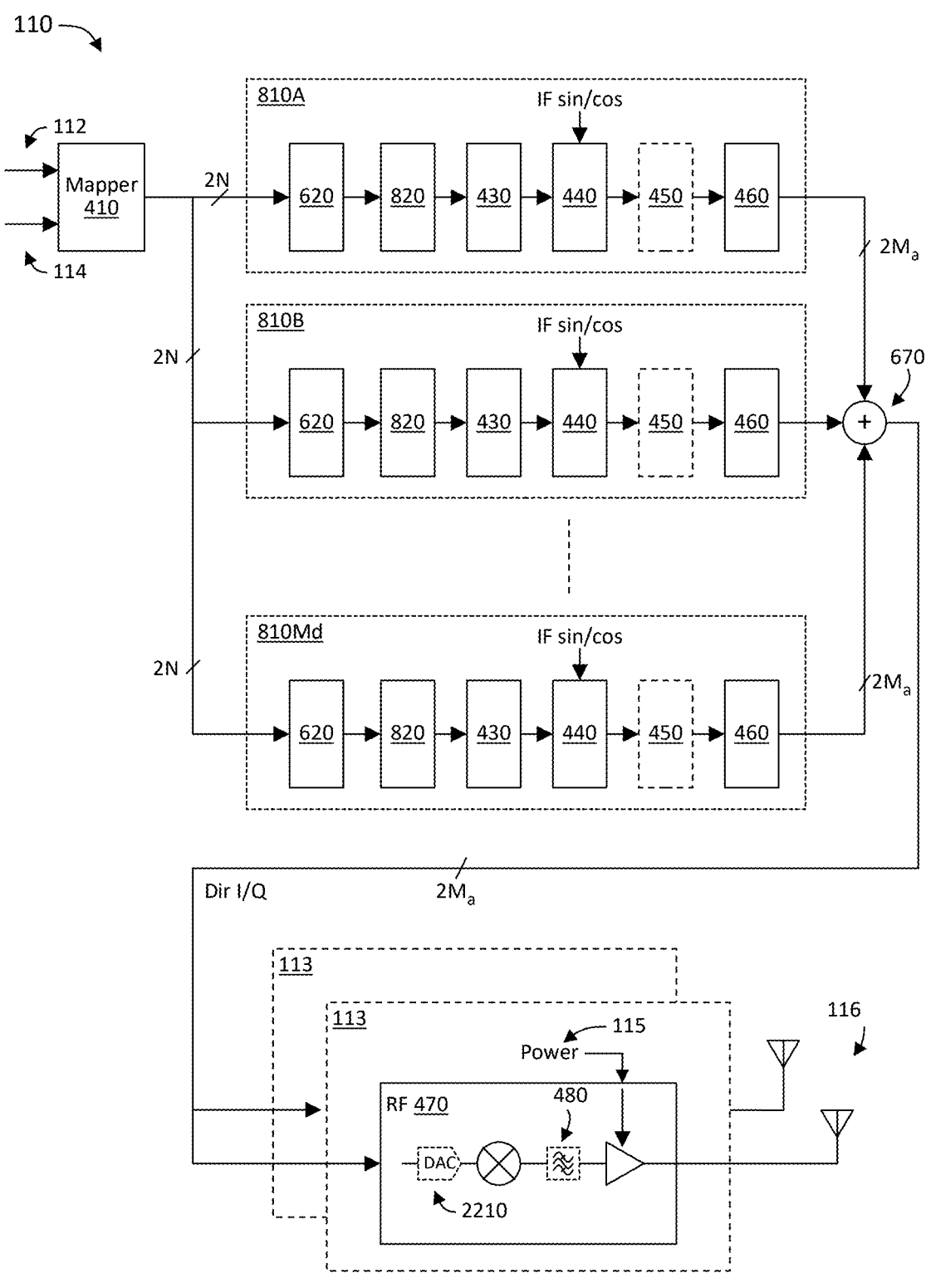
FIG. 8 illustrates an example of an implementation of a transmitter that can simultaneously transmit individually directed power and broadband data in multiple modulation types or even multiple standards, e.g. WiFi, Bluetooth, LTE, 5G, or any other modulation standard.

FIG. 8 illustrates an example of an implementation of a transmitter that can simultaneously transmit individually directed power and broadband data in multiple modulation types or even multiple modulation standards, e.g. WiFi, Bluetooth, LTE, 5G, or any other modulation standard. FIG. 8 is related and very similar to FIG. 6, with one data stream/power channel digital path 810A-$M_d$ per data stream (or power channel). However, the data stream/power channel digital paths 810A-$M_d$ are coupled with the output of mapper 410, and each one includes a first-level modulator 820 configured to modulate according to the relevant standard. The intermediate frequencies in the data stream/power channel digital paths 810A-$M_d$ may vary and the local oscillators (not drawn) in the RF backends 470 may vary. In some implementations, frequency selector 620 may be coupled between first-level modulator 820 and orthogonal subcarrier generator 430. In other implementations (as drawn), first-level modulator 820 may be coupled between frequency selector 620 and orthogonal subcarrier generator 430.

Figure 9:
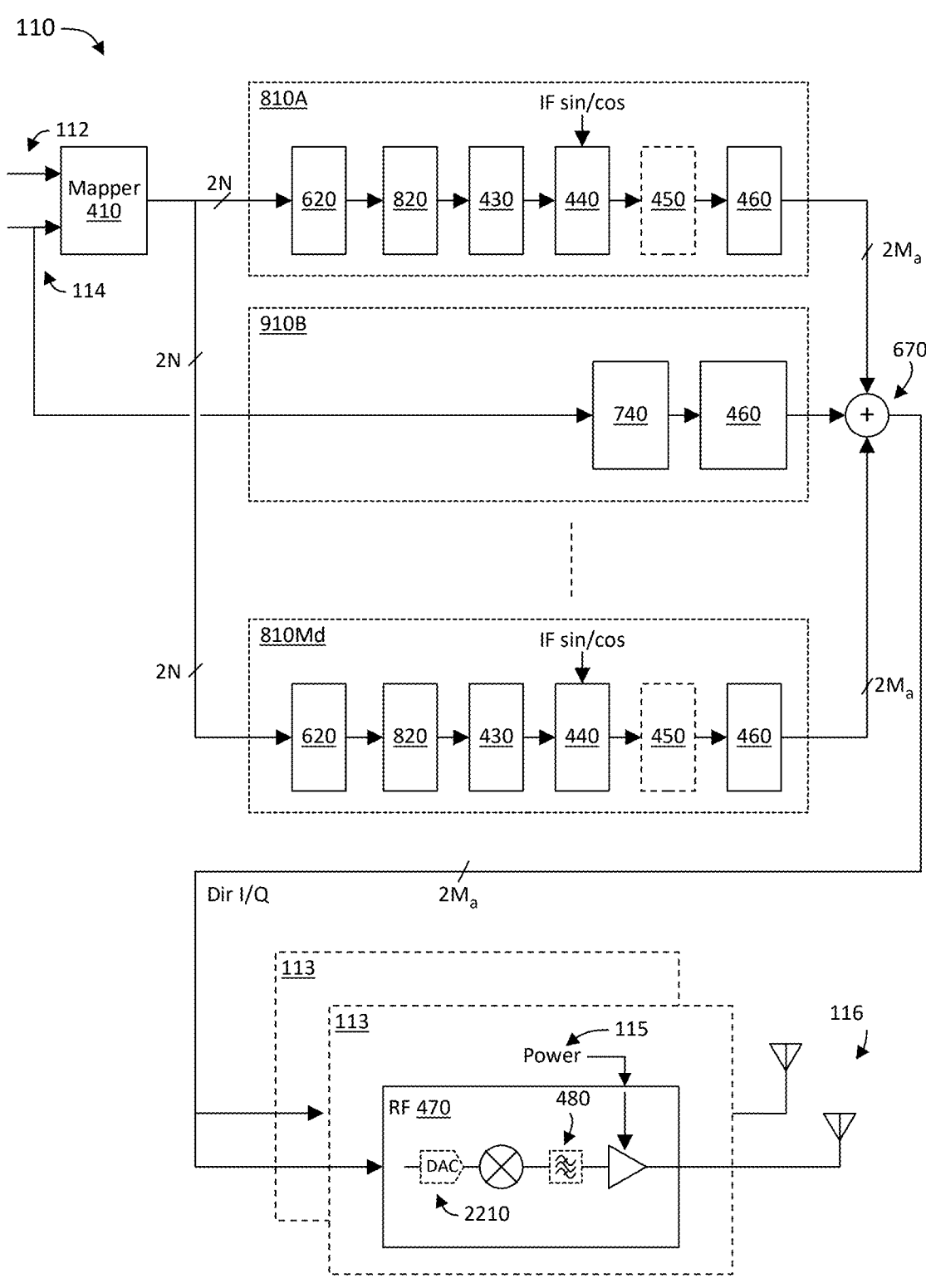
FIG. 9 illustrates an example of how the implementation of FIG. 8 can be modified to reduce silicon real estate for directional power transmission.

FIG. 9 illustrates an example of how the implementation of FIG. 8 can be modified to reduce silicon real estate for directional power transmission. Just like FIG. 7 replaces data stream/power channel digital path 610B with second path 710B which includes a memory 740 and a beamformer 460, FIG. 9 replaces data stream/power channel digital path 810B with second path 910B which includes memory 740 and beamformer 460. Again, for one or more subcarriers that carry wireless power or whose information doesn't change between successive frames, memory 740 in 910B stores the information that second-level modulator 440 or SSB prep unit 450 in data stream/power channel digital path 810B would have produced. Its content may be hardwired (ROM), preconfigured (NVM), entered from an external source via power information 114, or generated by data stream/power channel digital path 810A, for example during a system startup cycle prior to transmission.

Figure 10:
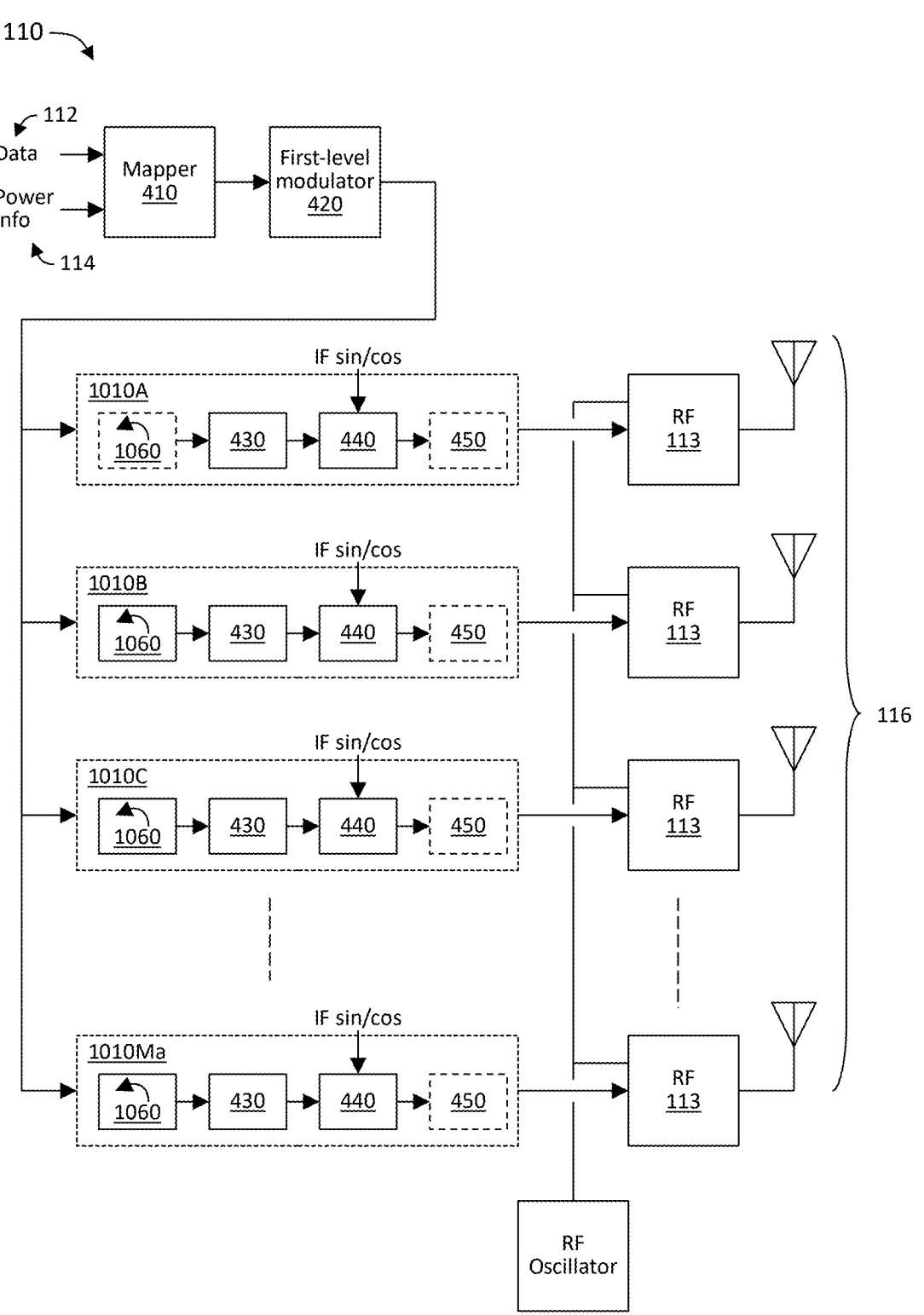
FIG. 10 illustrates an alternative example architecture for simultaneously transmitting multiple data streams and wireless power in multiple directions from any number of antennas.

FIG. 10 illustrates an alternative example architecture for simultaneously transmitting multiple data streams and wireless power in multiple directions from any number of antennas. This implementation of transmitter 110 allows for integration, for example in a monolithic IC, of the antenna channel digital path 1010A-$M_a$, and optionally even much or all of the antenna channel module 113. This way, each antenna in antenna arrangement 116 may be driven by one or a few ICs. For example, each of the $M_a$ antenna channels includes one of the antenna channel digital paths 1010A-$M_a$, one antenna channel module 113, and one antenna. All antenna channel modules 113 may share a single local oscillator (RF oscillator) to help ensure phase and frequency alignment. All antenna channel digital paths 1010A-$M_a$ share a single source of the IF in-phase and quadrature (IF sin/cos) clock or waveform, again to reduce or eliminate phase and frequency misalignment. Each antenna channel digital path 1010 may include a set of phase rotators 1060, an orthogonal subcarrier generator 430, a second-level modulator 440, and an optional SSB prep unit 450 to allow for SSB transmission.

The architecture allows each of $N_a$ active subcarriers (i.e., each subcarrier used for broadband data or for wireless power) to be transmitted with an individual radiation pattern. This is achieved by giving the subcarrier an individual phase rotation for each of the $M_a$ antennas or sub-antennas in antenna arrangement 116. Thus, assuming that a first (sub) antenna transmits the $N_a$ active subcarriers with reference phases (no phase rotation), the remaining $M_a-1$ (sub) antennas each need $N_a$ phase rotators for the $N_a$ active subcarriers. Thus, the architecture may need $(M_a-1)*N_a$ phase rotators 1060. For example, antenna channel digital path 1010A does not include any phase rotators 1060, but each antenna channel digital path 1010B-$M_a$ includes $N_a$ phase rotators 1060.

Each phase rotator in a set of phase rotators 1060 is configured to rotate the phase of a subcarrier specification provided by first-level modulator 420 to rotate the phase of the associated RF subcarrier transmitted by the associated antenna or sub-antenna in antenna arrangement 116 as needed for generating a beam including the RF subcarrier in the desired direction(s).

The architecture achieves phase rotation by rotating the subcarrier specifications delivered by first-level modulator 420 prior to generation of the subcarriers (in orthogonal subcarrier generator 430) for each of the (sub) antennas. The subcarriers destined for an antenna then are processed in a similar manner as shown in FIGS. 4 and 5, being modulated onto an IF in second-level modulator 440, being filtered or otherwise process in optional SSB prep unit 450 to remove either positive or negative frequencies (remove a sideband), and passed on to an antenna channel module 113 for transmission by the associated (sub) antenna. A beamformer 460 is not necessary, as the beams have already been formed by the phase rotators 1060.

As described, this architecture has the following features. It provides a simple architecture, suited for implementation in a single chip (or a few chips) per antenna channel. It provides the orthogonality needed for simultaneous transmission and reception of broadband data and wireless power. Every individual subcarrier can be directed dynamically.

Figure 11:
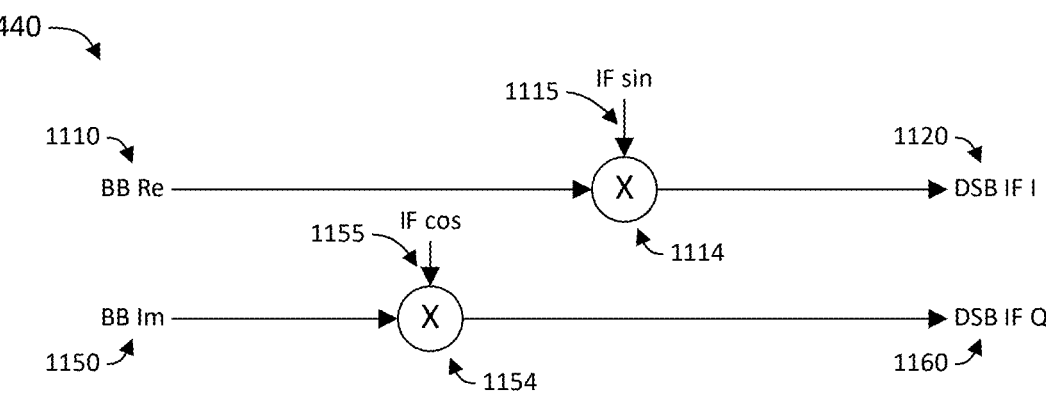
FIG. 11 illustrates an example implementation of second-level modulator 440. This second-level modulator provides DSB amplitude modulation for two independent input signals and produces two quadrature-modulated output signals.

FIG. 11 illustrates an example implementation of second-level modulator 440. This second-level modulator provides DSB amplitude modulation for two independent input signals and produces two quadrature-modulated output signals. Second-level modulator 440 receives BB Re signal 1110 and BB Im signal 1150, as well as IF sine wave 1115 and IF cosine wave 1155. A multiplier 1114 multiplies BB Re signal 1110 with IF sine wave 1115, and multiplier 1154 multiplies BB Im signal 1150 with IF cosine wave 1155 to obtain DSB IF I signal 1120 and DSB IF Q signal 1160, respectively. Since IF sine wave 1115 and IF cosine wave 1155 have a phase difference of ninety degrees, they are orthogonal to each other, and even when DSB IF I signal 1120 and DSB IF Q signal 1160 are summed at some later stage, the input signals can be individually recovered (demodulated) by parallel multiplication of the summed signal with a sine wave that matches IF sine wave 1115 and a cosine wave that matches IF cosine wave 1155. Like the input signals, the output signals DSB IF I signal 1120 and DSB IF Q signal 1160 jointly represent a complex valued signal.

Figure 12:
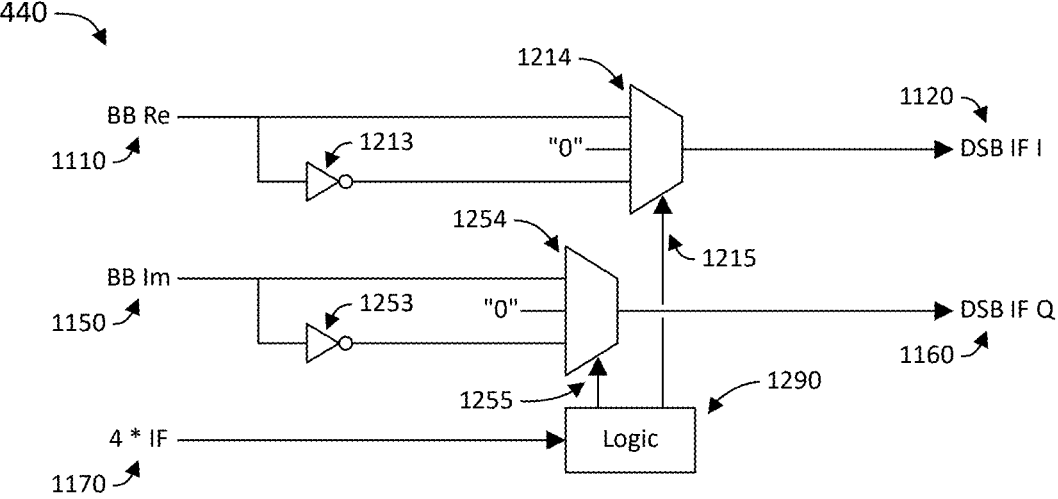
FIG. 12 illustrates another example implementation of second-level modulator 440. This implementation may be used when the local digital logic clock speed is an even number times the IF.

FIG. 12 illustrates another example implementation of second-level modulator 440. This implementation may be used when the local digital logic clock speed is an even number times the IF and DAC 2010 effectively samples at four times the IF, or DAC 2010 and DAC 2040 effectively sample at twice the IF. For example, at a clock speed of four times the IF, successive values in an IF sine wave are 0, 1, 0, and −1, whereas successive values in an IF cosine wave are 1, 0, −1, and 0. A binary number inverter 1213 generates the negative of the BB Re signal (multiplication with −1) and binary number inverter 1253 generates the negative of the BB Im signal (multiplication with −1). Binary number multiplexer 1214 selects among its input values BB Re, negative BB Re, and zero based on first select signal 1215, and binary number multiplexer 1254 selects among its input values BB Im, negative BB Im, and zero based on second select signal 1255. Logic circuit 1290, which may comprise a counter and/or combinational logic, derives first select signal 1215 and second select signal 1255 from its input which receives, for example, a clock signal 1170 at four times the intermediate frequency.

Since at a clock speed of four times the intermediate frequency the I and Q signals alternate (I equals 0 when Q is not 0, and Q equals 0 when I is not 0), an implementation may "add" the I and Q signals by combining binary number multiplexer 1214 and binary number multiplexer 1254 into a single multiplexer that has BB Re, minus BB Re, BB Im, and minus BB Im as its input signals. In some implementations, its single output signal may be directly applied to SSB prep unit 450 or DAC 2010, sampling at four times IF.

Figure 13:
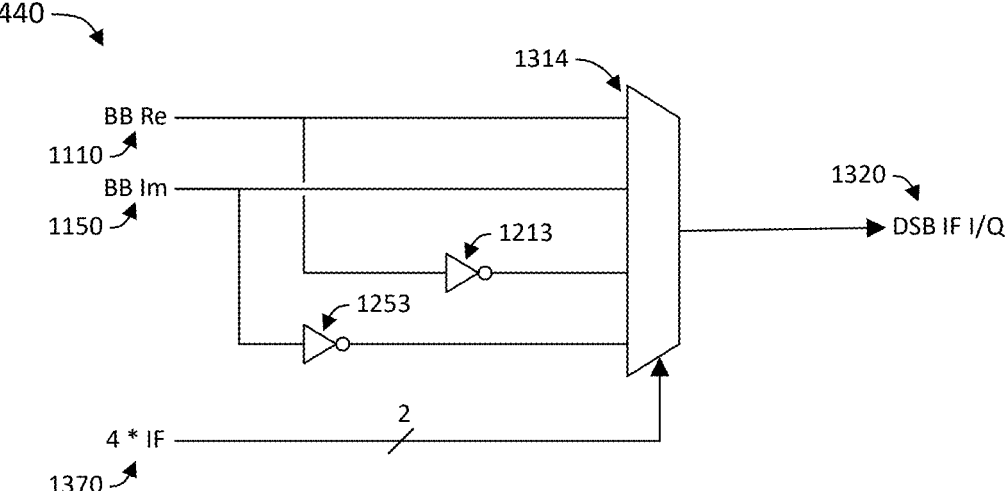
FIG. 13 illustrates yet another example implementation of second-level modulator 440. It adds the output signals to a combined in-phase and quadrature modulated DSB IF signal. This implementation may be used when the local digital logic clock speed is four times the IF.

FIG. 13 illustrates yet another example implementation of second-level modulator 440. It adds the output signals to a combined in-phase and quadrature modulated DSB IF signal. This implementation may be used when the local digital logic clock speed is four times the IF. In this case, second-level modulator 440 receives BB Re signal 1110 and BB Im signal 1150 from orthogonal subcarrier generator 430 and generates their inverse values with binary number inverter 1213 and binary number inverter 1253. The four signals are provided to four-input first multiplier 1314 which cyclically, determined by select signal 1370, passes each of the four input signals to its DSB combined IF output signal 1320.

Figure 14:
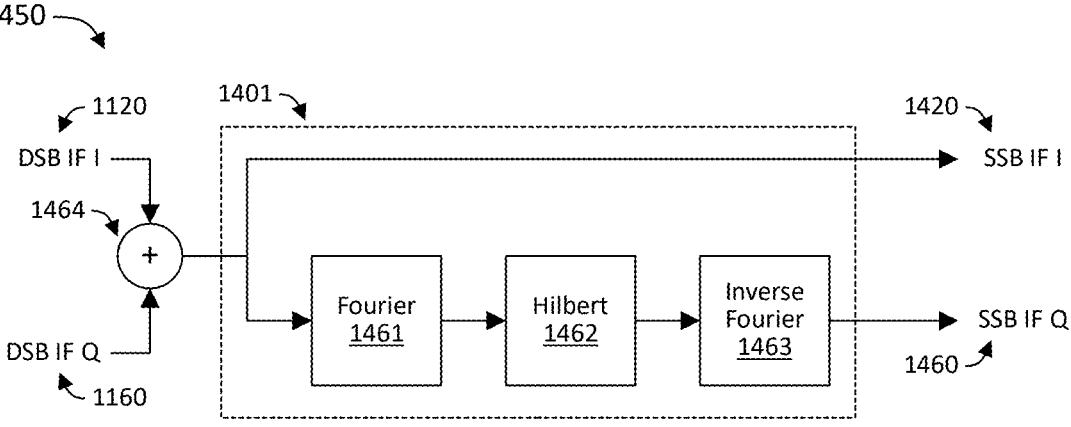
FIG. 14 illustrates an example implementation of SSB prep unit 450 based on Marple's method. This digital-domain circuit can take an input signal and produce orthogonal output signals with either negative or positive frequencies removed. Because of its digital nature and relative simplicity, it can remove a sideband even for very high-bandwidth signals. Marple's method can produce an ideal SSB filter with brick walls and linear phase.

FIG. 14 illustrates an example implementation of SSB prep unit 450 based on Marple's method. This digital-domain circuit can take an orthogonal or nonorthogonal input signal and produce orthogonal output signals that can be used as quadrature inputs for beamforming and/or RF translation. Because of its digital nature and relative simplicity, it can remove a sideband even for very high-bandwidth signals. SSB prep unit 450 may receive DSB IF I signal 1120 and DSB IF Q signal 1160 and add these signals in adder 1464. The added signals enter Marple's unit 1401, which performs functionality ("Marple's method") as described in "Computing the discrete-time 'analytic' signal via FFT," by S. L. Marple Jr, IEEE Transactions on Signal Processing, Volume 47, September 1999, which is incorporated by reference herein, to remove the lower sideband (negative frequencies). Marple's unit 1401 outputs the added signals as SSB IF I signal 1420, but also performs a Hilbert transform on the added signals. The added signal enters a second path to remove the negative frequencies and scale the positive frequencies, generating the frequency spectrum of an orthogonal output signal, SSB IF Q signal 1460. This implementation performs the Hilbert transform in the frequency domain, utilizing, e.g., a Fourier transform 1461 or an FFT to obtain the complex frequency spectrum of SSB IF I signal 1420. Fourier transform 1461 transforms time-domain values from adder 1464 into frequency-domain values. Hilbert transform unit 1462 processes the frequency components as described by Marple. An inverse Fourier transform 1463 or IFFT transforms the remaining frequency-domain values back to time-domain values to obtain SSB IF Q signal 1460. Removing negative frequencies results in SSB IF Q signal 1460 which together with SSB IF I signal 1420 represents a complex valued signal.

Although in the above implementation Hilbert transform unit 1462 removes negative frequencies, other implementations may remove positive frequencies, resulting in filtering out the higher sideband instead of the lower sideband.

Figure 15:
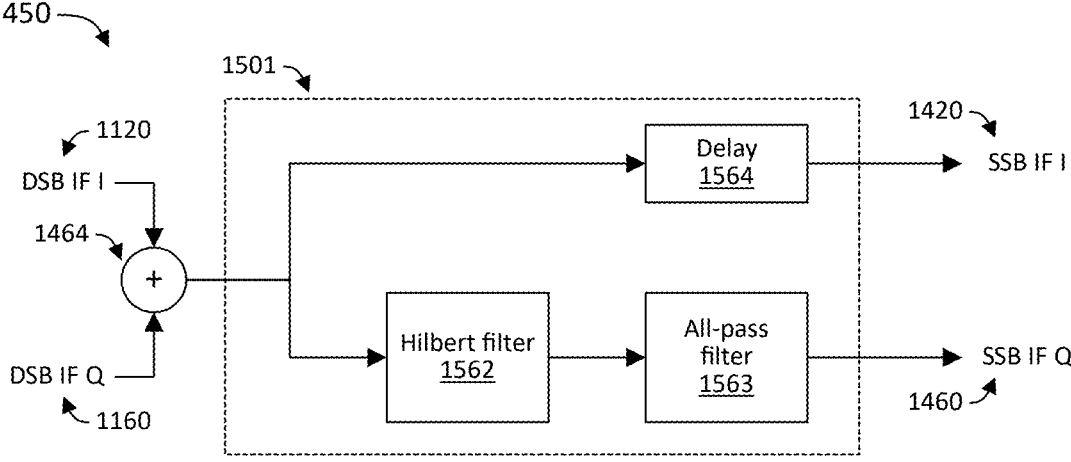
FIG. 15 illustrates another example implementation of SSB prep unit 450, based on a Hilbert filter 1562.

FIG. 15 illustrates another example implementation of SSB prep unit 450, based on a Hilbert filter 1562. The Hilbert filter can reduce or negate negative (or positive) frequencies and thus function as an SSB filter. In some implementations, the Hilbert filter is followed by an all-pass filter with phase response designed to compensate for any phase distortion that may occur in the Hilbert filter. A delay unit may compensate for delays in the Hilbert filter and the all-pass filter. In this implementation, SSB prep unit 450 includes SSB filter 1501 with Hilbert filter 1562 that operates in the time domain, unlike Hilbert transform unit 1462 which operates in the frequency domain. However, Hilbert filter 1562 may introduce some group delay or frequency-dependent phase errors. To compensate for phase errors, some implementations follow Hilbert filter 1562 by all-pass filter 1563. To compensate for delays in Hilbert filter 1562 and all-pass filter 1563 an implementation may include delay line 1564, which may be a first-in first-out (FIFO) memory that evens out the delay in the upper branch shown in FIG. 15.

Hilbert filters are well known in the art, see for example Carrick, Matt; Jaeger, Doug; and Harris, Fred (2011), "Design And Application Of A Hilbert Transformer In A Digital Receiver," Proceedings of the SDR 11 Technical Conference and Product Exposition, Wireless Innovation Forum, Chantilly, VA. Also, see https://en.wikipedia.org/wiki/Hilbert_transform (Mar. 14, 2014). Both are incorporated by reference as if set forth in full herein.

Figure 16:
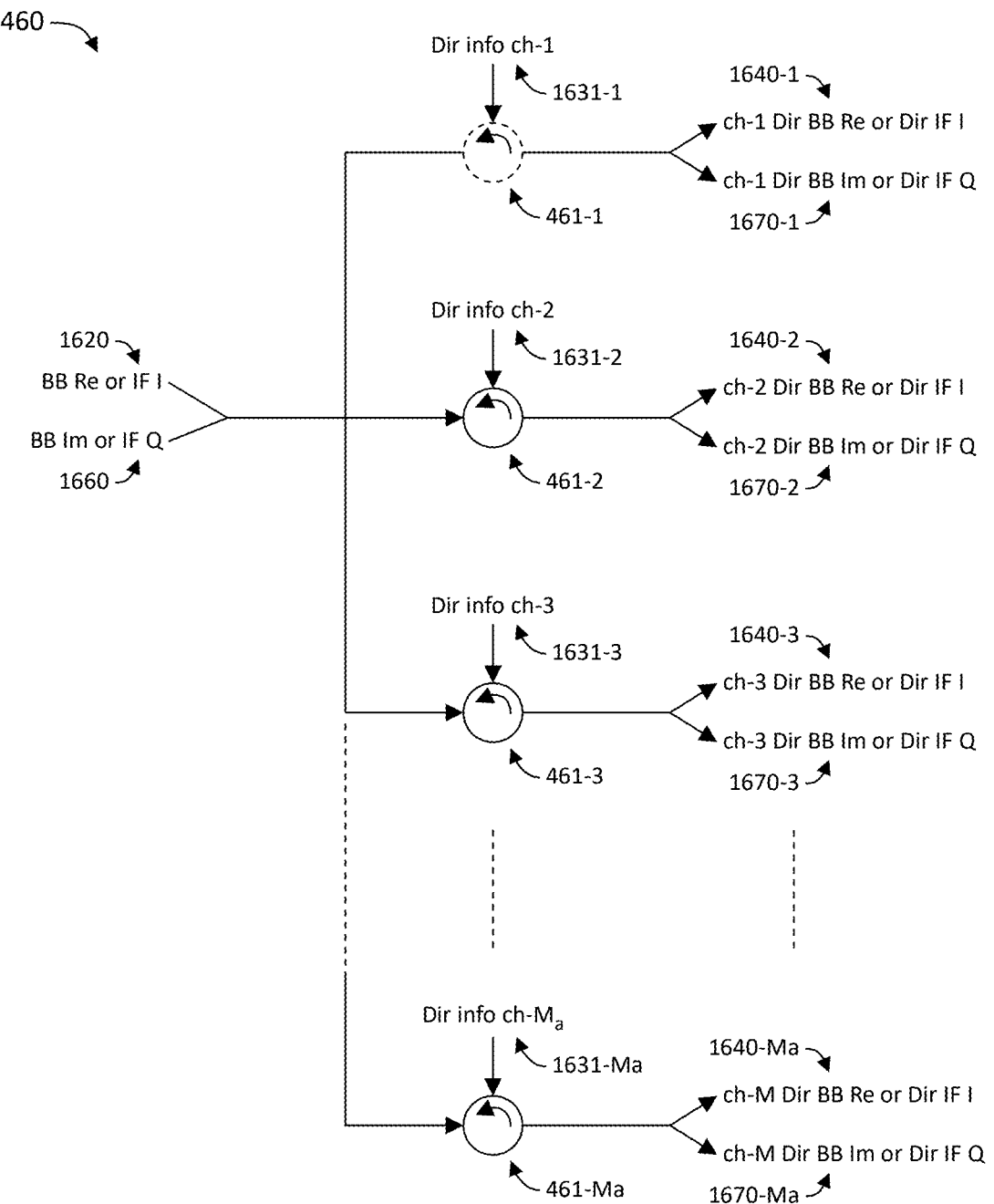
FIG. 16 illustrates an example of beamformer 460.

FIG. 16 illustrates an example of beamformer 460. Beamformer 460 receives a baseband real or IF in-phase signal 1620 and a baseband imaginary or IF quadrature signal 1660. It may pass baseband real or IF in-phase signal 1620 on to a first output as a first-channel directed baseband real or directed IF in-phase signal 1640-1, and baseband imaginary or IF quadrature signal 1660 as a first-channel directed baseband imaginary or directed IF quadrature signal 1670-1. As an example, the implementation may use these signals for a first sub-antenna in antenna arrangement 116. Other sub-antennas may transmit signals that are appropriately delayed or phase rotated with respect to the first sub-antenna so that the resulting transmitted electromagnetic field is stronger in a desired direction than in other directions. For signals of a single frequency (in this case the IF frequency which is amplitude modulated by, for example, second-level modulator 440) delaying the signals may be achieved by phase rotating them. Thus, if transmitter 110 is used with a antenna arrangement 116 that has M sub-antennas, signals for M-1 sub-antennas may need to be phase rotated versus each other and versus the first sub-antenna. Beamformer 460 thus includes M-1 phase rotators 461-2 . . . M. Each of those receives baseband real or IF in-phase signal 1620 and baseband imaginary or IF quadrature signal 1660 and performs a phase rotation using directional information 1631.

FIG. 17 illustrates an example of a set of phase rotators 1060. Example set of phase rotators 1060 receives N subcarrier specifications 1710-1 . . . N for N subcarriers, each including a real part (Re) of the specification and an imaginary part (Im). At its output, it delivers N rotated subcarrier specifications 1720-1 . . . N, including a real part and an imaginary part, to deliver to an orthogonal subcarrier generator 430. In some implementations, there may be fewer than N sets of inputs and outputs, or outputs may be directly connected to their respective inputs. For example, guard subcarriers at the edges of the N subcarriers may always be left unused (untransmitted) to provide some margin against adjacent channel interference. For those cases, the orthogonal subcarrier generator 430 may have its guard subcarrier inputs hardwired at zero, obviating the need for associated hardware in the set of phase rotators 1060. For each subcarrier that must carry data, or whose radiation pattern may need to be changed even if its amplitude and phase are otherwise predetermined, the set of phase rotators 1060 includes a phase rotator 461. At its inputs, a phase rotator 461-*j* receives a subcarrier specification 1710-*j* and subcarrier directional information 1731-*j* for a particular (sub) antenna in antenna arrangement 116 (where 1≤j≤N) and performs a complex multiplication to calculate the rotated subcarrier specification 1720-*j* output signal associated with the (sub) antenna. It forwards this output signal to the associated orthogonal subcarrier generator 430.

Figure 18:
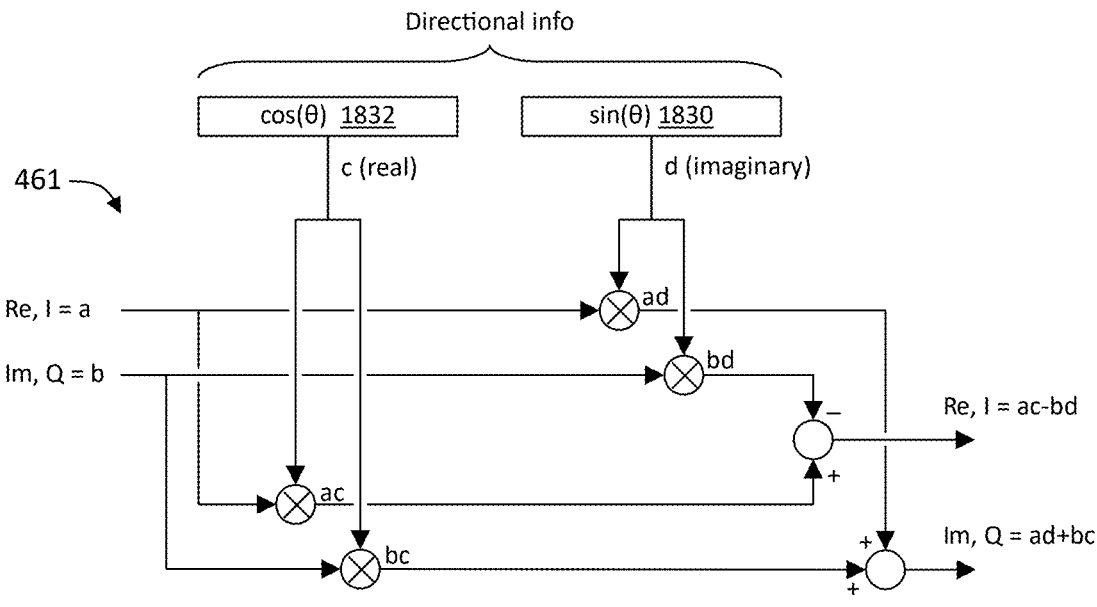
FIG. 18 illustrates an example of phase rotator 461 that can be used as part of a beamformer 460 or as part of a set of phase rotators 1060 for a complex input signal, producing a complex output signal.

FIG. 18 illustrates an example of phase rotator 461, that can be used as part of a beamformer 460 or as part of a set of phase rotators 1060 for a complex input signal, producing a complex output signal. The depicted circuit multiplies a complex input signal a+ib with complex scalar c+id, where $i^2$=−1. If c equals the cosine of an angle θ and d equals the sine of the angle θ then the output signal matches the input signal, unscaled, but rotated over the angle θ. The circuit, along with other circuits, is well known in the art, and an implementation may use any such circuits.

Phase rotator 461 includes a first multiplier configured to receive a first IF I signal and first directional information 1830 including the sine of the rotation angle θ, a second multiplier configured to receive a first IF Q signal and the first directional information 1830, a third multiplier configured to receive the first IF I signal and second directional information 1832 including a cosine of the rotation angle θ, a fourth multiplier configured to receive the first IF Q signal and second directional information 1832, a subtractor configured to calculate a difference between outputs of the second multiplier and the third multiplier and to output the first directed IF I signal, and an adder configured to calculate a sum of values of outputs of the first multiplier and the fourth multiplier, and to output the first directed IF Q signal.

Figure 19:
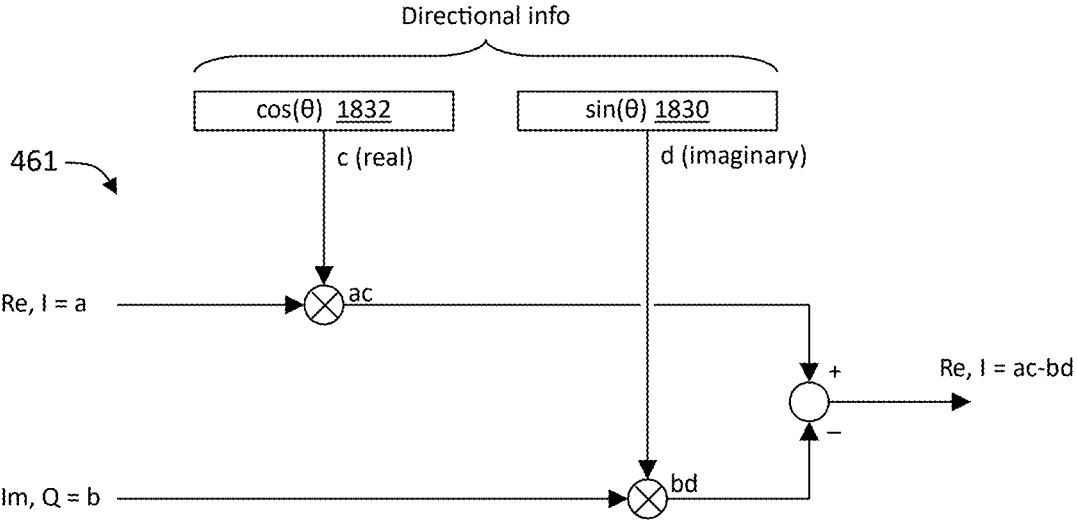
FIG. 19 illustrates another example of phase rotator 461 with a single output and based only on scaling the signal.

FIG. 19 illustrates another example of phase rotator 461 with a single output and based only on scaling the signal. This circuit is a subset of the circuit in FIG. 18, and does not calculate the imaginary value of the rotated signal.

Figure 20:
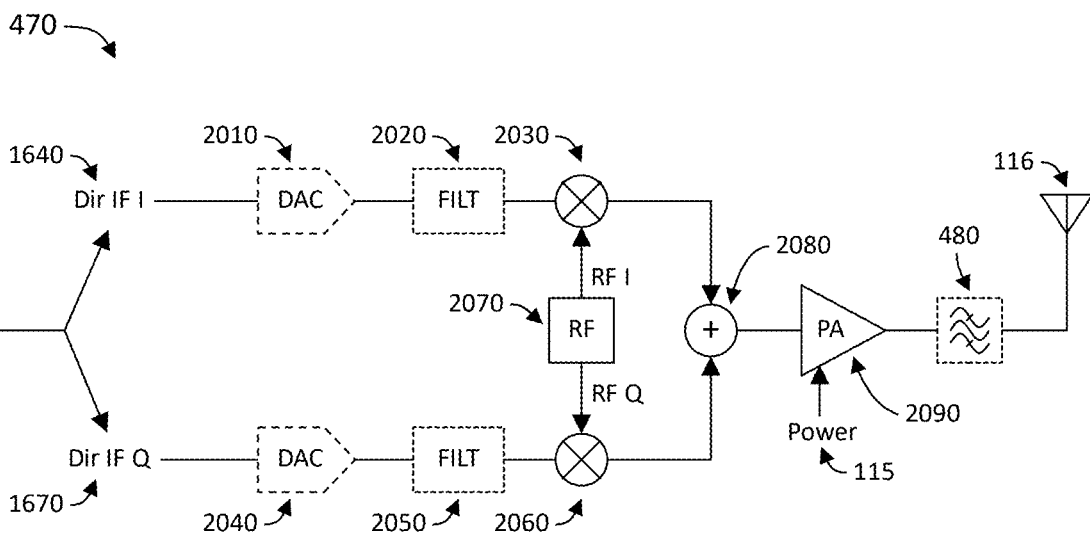
FIG. 20 illustrates an example unit of the radio frequency (RF) backend used to drive an antenna or a sub-antenna in an antenna arrangement. Each sub-antenna requires one unit of the RF backend. The RF backend may include two DACs, each of which may be operated at twice the IF frequency used by the second-level modulator.

FIG. 20 illustrates an example unit of RF backend 470 used to drive an antenna or a sub-antenna in antenna arrangement 116. Each sub-antenna requires one unit of RF backend 470, which may be included in an antenna channel module 113 along with other circuits. RF backend 470 receives directed IF I signal 1640 and directed IF Q signal

1670 which, if digital, DAC 2010 and DAC 2040 convert to analog signals. Two optional filters 2020 and 2050 coupled with DAC 2010 and DAC 2040 may remove unwanted frequency components from the DAC output signals, and the resulting clean directed analog IF I and Q signals are provided to RF I mixer 2030 and RF Q mixer 2060, which may be a pair of analog multipliers that also receive an in-phase and quadrature (sine and cosine) version of an RF oscillator signal. The RF mixer signals of all units of RF backend 470 may come from a single central oscillator 2070 (as opposed to a local oscillator) to ensure that all subantennas receive RF signals that are phase aligned. The mixer output signals may be further filtered to remove unwanted frequency components (filter not shown) and are added in adder 2080 which creates a composite RF signal. An RF power amplifier 2090, which receives power 115 as well as the composite RF signal, amplifies the composite RF signal and forwards the amplified signal to the associated sub-antenna in antenna arrangement 116. Some implementations include RF filter 480 before or after RF power amplifier 2090, for example to remove a sideband from a DSB signal. The example RF backend shown in FIG. 20 is basic, and many variations and improvements are known in the industry. All such variations and improvements are within the scope and the ambit of the disclosed technology.

While FIG. 1 showed that transmitter 110 receives both power information 114 and power 115, the power information 114 is used to specify power subcarriers 212. The implementation uses power 115 both for power subcarriers and other subcarriers. In some cases, the power to be transmitted in power subcarriers can be a substantial part of the total power.

Figure 21:
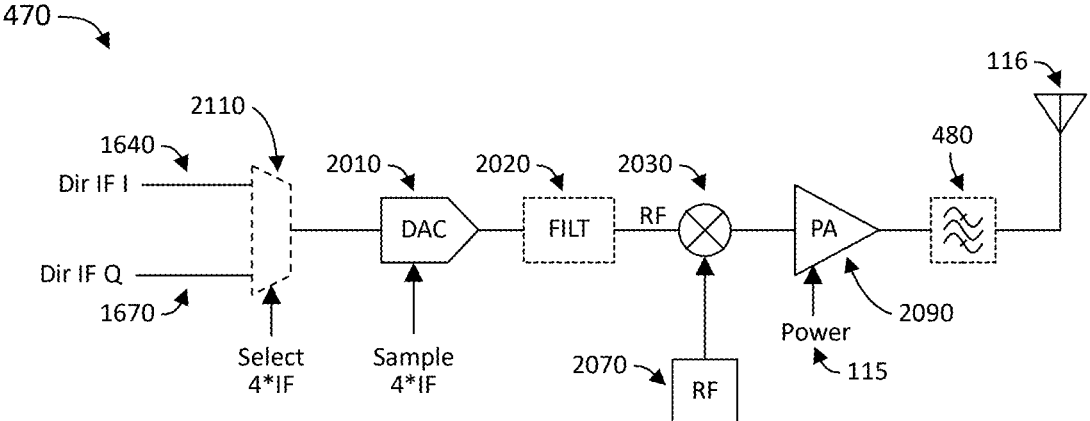
FIG. 21 illustrates another example of RF backend 470 that uses a single DAC. The DAC may be operated at four times the IF frequency used by the second-level modulator.

FIG. 21 illustrates another example of RF backend 470 that uses a single DAC. DAC 2010 may be operated at four times the IF frequency used by the second-level modulator. If, as drawn, directed IF I signal 1640 and directed IF Q signal 1670 have not been "summed" previously, optional multiplexer 2110 alternatingly selects directed IF I signal 1640 and directed IF Q signal 1670. This action adds the two signals, since they're orthogonal. (Other implementations may use a digital adder instead of a multiplexer, but an adder is generally more complex and slower than a two-input multiplexer.) Optional filter 2020 removes unwanted frequency components from the DAC output signal and forwards the resulting clean directed analog IF signal to RF I mixer 2030 which also receives the RF oscillator signal. The RF mixer signals of all units of RF backend 470 may come from a single central oscillator 2070 (as opposed to a local oscillator) to help ensure phase alignment of the RF signals that sub-antennas receive. The mixer output signal creates a composite RF signal that may be further filtered to remove unwanted frequency components. RF power amplifier 2090, which receives power 115 as well as the composite RF signal, amplifies the composite RF signal and forwards the amplified signal to the associated sub-antenna in antenna arrangement 116. Some implementations include RF filter 480 before or after RF power amplifier 2090, for example to remove a sideband from a DSB signal. The example RF backend shown in FIG. 21 is basic, and many variations and improvements are known in the industry. All such variations and improvements are within the scope and the ambit of the disclosed technology.

FIG. 22 illustrates an example method 2200 for simultaneously transmitting broadband data and wireless power in multiple directions. Method 2200 can be used, for example, with the architectures of FIGS. 6-7 and includes:

2210—Associating at least a first part of a first data stream with a first subcarrier to obtain a first mapped data and at least a part of a power information with a second subcarrier to obtain a second mapped data. Some implementations associate the at least first part of the first data stream with a first group of subcarriers, and/or the at least part of the power information with a second group of subcarriers.

2220—In a first-level modulator, using the first mapped data to generate a first subcarrier specification and the second mapped data to generate a second subcarrier specification, wherein the first subcarrier specification and the second subcarrier specification each include a real part and an imaginary part, and wherein the first-level modulator uses a first modulation type for the first subcarrier specification. It may use the first modulation type or a second modulation type for the second subcarrier specification.

2230—In a first data stream/power channel digital path, selecting the first subcarrier specification, generating the first subcarrier based on the first subcarrier specification, modulating the first subcarrier onto an intermediate frequency (IF), and beamforming the modulated first subcarrier for transmission in a first direction via a first antenna and a second antenna in an antenna arrangement.

2240—(Optional) Associating a second part of the first data stream with a third subcarrier to obtain a third mapped data; in the first-level modulator, using the third mapped data to generate a third subcarrier specification; and in the first data stream/power channel digital path, selecting the third subcarrier specification, generating the third subcarrier based on the third subcarrier specification, modulating the third subcarrier onto the IF, and beamforming the modulated third subcarrier for transmission in a third direction via the first antenna and the second antenna.

2250—(Optional) In the first data stream/power channel digital path, using Marple's method to remove one of negative frequencies and positive frequencies from a frequency spectrum of the modulated first subcarrier.

2260—(Optional) In a second data stream/power channel digital path, selecting the second subcarrier specification, generating the second subcarrier based on the second subcarrier specification, and modulating the second subcarrier onto the IF to obtain the modulated second subcarrier. An implementation may perform one of 2260 and 2270.

2270—(Optional) In the second data stream/power channel digital path, retrieving the modulated second subcarrier from a memory. The modulated second subcarrier is based on the second mapped data. An implementation may perform one of 2260 and 2270.

2280—In the second data stream/power channel digital path, beamforming the modulated second subcarrier for transmission in a second direction via the first antenna and the second antenna.

FIG. 23 illustrates an example method 2300 for simultaneously transmitting broadband data and wireless power in multiple directions and with multiple modulation types. Method 2300 can be used, for example, with the architectures of FIGS. 8-9 and includes:

2310—Associating at least a first part of a first data stream with a first subcarrier to obtain a first mapped data, at least a second part of a second data stream with a second subcarrier to obtain a second mapped data, and at least a third part of a power information with a third subcarrier to obtain a third mapped data.

2320—In a first data stream/power channel digital path, selecting the first mapped data, using the first mapped data to generate a first subcarrier specification based on a first modulation type, generating the first subcarrier based on the first subcarrier specification, modulating the first subcarrier onto an intermediate frequency (IF), and beamforming the modulated first subcarrier for transmission in a first direction via a first antenna and a second antenna.

2330—In a second data stream/power channel digital path, selecting the second mapped data, using the second mapped data to generate a second subcarrier specification based on a second modulation type, generating the second subcarrier based on the second subcarrier specification, modulating the second subcarrier onto the IF, and beamforming the modulated second subcarrier for transmission in a second direction via the first antenna and the second antenna.

2340—(Optional) In the first data stream/power channel digital path and in the second data stream/power channel digital path, using Marple's method to remove one of negative frequencies and positive frequencies from frequency spectra of the modulated first subcarrier and the modulated second subcarrier.

2350—(Optional) In a third data stream/power channel digital path, selecting the third subcarrier specification, generating the third subcarrier based on the third subcarrier specification, and modulating the third subcarrier onto the IF to obtain the modulated third subcarrier. An implementation may perform one of 2350 and 2360.

2360—(Optional) In the third data stream/power channel digital path, retrieving the modulated third subcarrier from a memory. The modulated third subcarrier is based on the third mapped data. An implementation may perform one of 2350 and 2360.

2370—In the third data stream/power channel digital path, beamforming a modulated third subcarrier for transmission in a third direction via the first antenna and the second antenna.

FIG. 24 illustrates an example method 2400 for simultaneously transmitting multiple data streams and wireless power in multiple directions from any number of antennas. An implementation may use, for example, the architecture in FIG. 10. Method 2400 includes:

2410—Associating at least a first part of a first data stream with a first subcarrier to obtain a first mapped data, at least a second part of a second data stream with a second subcarrier to obtain a second mapped data, and at least a third part of a power information with a third subcarrier to obtain a third mapped data.

2420—In a first-level modulator, using the first mapped data to generate a first subcarrier specification, the second mapped data to generate a second subcarrier specification, and the third mapped data to generate a third subcarrier specification, wherein the first subcarrier specification, the second subcarrier specification, and the third subcarrier specification each include a real part and an imaginary part. Method 2400 may continue with 2430, 2440, and 2450 in parallel.

2430—In a first data stream/power channel digital path:

2432—Phase rotating the first subcarrier specification for transmission on a first antenna in the first direction to obtain a first phase-rotated first subcarrier specification, phase rotating the second subcarrier specification for transmission on the first antenna in a second direction to obtain a first phase-rotated second subcarrier specification, and phase rotating the third subcarrier specification for transmission on the first antenna in a third direction to obtain a first phase-rotated third subcarrier specification. The phrase "phase rotating a subcarrier specification", as used here, means rotating, by a desired angle, a vector defined by a complex number that specifies a subcarrier phase.

To understand this, compare the process in FIG. 10 (phase rotation of a subcarrier specification) with the process in FIG. 6 (beamforming an IF signal). Suppose an example carrier specification for QPSK, where the subcarrier is to encode data that requires a 135-degrees angle. In a first antenna it is transmitted as is (with a phase of 135 degrees), but in a second antenna the phase must be shifted by an additional 10 degrees to beam the signal in a desired direction. In both FIGS. 6 and 10, first-level modulator 420 receives the data and produces the 135-degrees subcarrier specification in accordance with the QPSK coding scheme. In FIG. 6, data stream/power channel digital path 610A receives the subcarrier specification, and frequency selector 620 selects the subcarrier specification for processing in data stream/power channel digital path 610A. (Other frequency selectors may ignore it.) Orthogonal subcarrier generator 430 generates the subcarrier, with a phase of 135 degrees, as specified. Second-level modulator 440 modulates the subcarrier on the IF frequency, and beamformer 460 passes it on for the RF unit of the first antenna but rotates the IF and thus the subcarrier by 10 degrees for the second antenna. Thus, the second antenna transmits a signal with a total rotation of 145 degrees. In FIG. 10, however, each antenna channel digital path 1010A-B (there are two because there are two antennas) receives the 135-degrees subcarrier specification. Phase rotators 1060 in antenna channel digital path 1010A are optional and are skipped because the first antenna transmits an unrotated data signal. Orthogonal subcarrier generator 430 in antenna channel digital path 1010A generates the subcarrier with a phase of 135 degrees as specified. It is IF modulated in second-level modulator 440 (in 1010A) and forwarded to the RF unit of the first antenna. However, the second antenna must transmit the signal with a total phase of 145 degrees, so phase rotators 1060 in 1010B rotates the subcarrier's specification with 10 degrees to get a modified subcarrier specification of 145 degrees. Orthogonal subcarrier generator 430 in 1010B generates the subcarrier with a phase of 145 degrees. Second-level modulator 440 in 1010B modulates this on the IF and the signal is forwarded to the RF unit of the second antenna.

Thus, rotating the subcarrier specification is just as effective as rotating the subcarrier itself, or the IF signal, or the RF signal. Since both the subcarrier specification and the IF signal can be complex signals, the same circuit can carry out the rotation: phase rotator 461 in FIG. 18, which is the main building block of both beamformer 460 and phase rotators 1060.

2434—Generating a first-antenna first subcarrier, a first-antenna second subcarrier, and a first-antenna third subcarrier based on the first phase-rotated first subcarrier specification, the first phase-rotated second subcarrier specification, and the first phase-rotated third subcarrier specification.

2436—Modulating the first-antenna first subcarrier, the first-antenna second subcarrier and the first-antenna third subcarrier onto an intermediate frequency (IF) to generate a first antenna IF signal.

2438—(Optional) Removing positive or negative frequencies in the first antenna IF signal to obtain an SSB IF signal, for example by using Marple's method as illustrated in FIG. 14 and more fully described in "Computing the discrete-time 'analytic' signal via FFT," by S. L. Marple Jr, IEEE Transactions on Signal Processing, Volume 47, September 1999, which is incorporated by reference herein, or by using a Hilbert filter as illustrated in FIG. 15.

2439—Forwarding the first antenna IF signal to a first antenna channel module for transmission on the first antenna.

2440—In a second data stream/power channel digital path:

2442—Phase rotating the first subcarrier specification for transmission on a second antenna in the first direction to obtain a second phase-rotated first subcarrier specification, phase rotating the second subcarrier specification for transmission on the second antenna in the second direction to obtain a second phase-rotated second subcarrier specification, and phase rotating the third subcarrier specification for transmission on the second antenna in the third direction to obtain a second phase-rotated third subcarrier specification.

2444—Generating a second-antenna first subcarrier, a second-antenna second subcarrier, and a second-antenna third subcarrier based on the second phase-rotated first subcarrier specification, the second phase-rotated second subcarrier specification, and the second phase-rotated third subcarrier specification.

2446—Modulating the second-antenna first subcarrier, the second-antenna second subcarrier and the second-antenna third subcarrier onto the IF to generate a second antenna IF signal. Some implementations remove positive or negative frequencies in the second antenna IF signal to obtain an SSB IF signal, for example by using Marple's method or by using a Hilbert filter.

2448—Forwarding the second antenna IF signal to a second antenna channel module for transmission on the second antenna.

2450—In a third data stream/power channel digital path:

2452—Phase rotating the first subcarrier specification for transmission on a third antenna in the first direction to obtain a third phase-rotated first subcarrier specification, phase rotating the second subcarrier specification for transmission on the third antenna in the second direction to obtain a third phase-rotated second subcarrier specification, and phase rotating the third subcarrier specification for transmission on the third antenna in the third direction to obtain a third phase-rotated third subcarrier specification 2454—Generating a third-antenna first subcarrier, a third-antenna second subcarrier, and a third-antenna third subcarrier based on the third phase-rotated first subcarrier specification, the third phase-rotated second subcarrier specification, and the third phase-rotated third subcarrier specification 2456—Modulating the third-antenna first subcarrier, the third-antenna second subcarrier and the third-antenna third subcarrier onto the IF to generate a third antenna IF signal. Some implementations remove positive or negative frequencies in the third antenna IF signal to obtain an SSB IF signal, for example by using Marple's method or by using a Hilbert filter.

2458—forwarding the third antenna IF signal to a third antenna channel module for transmission on the third antenna.

As described elsewhere in this document, implementations not using Marple's method or Hilbert filtering may provide an RF filter 480 in RF backend 470 or antenna channel module 113 to obtain a single-sideband signal for transmission, or use any other method known in the art to remove a sideband.

Particular Implementations

Described implementations of the subject matter can include one or more features, alone or in combination, as described in the following clauses.

Clause 1. A transmitter, comprising:

a mapper 410 configured to map data bits 112 and power information 114 to N subcarriers to obtain mapped information, wherein N is an integer of at least 1;

a first-level modulator 420 coupled with an output of the mapper 410 and configured to receive the mapped information and convert the mapped information into subcarrier specifications, wherein a subcarrier specification includes a complex number that defines an amplitude and a phase of a subcarrier;

two or more units of a data stream/power channel digital path 610 each including:

a frequency selector 620 configured to pass on a first part of the subcarrier specifications related to a first part of the N subcarriers and to ignore a second part of the subcarrier specifications;

an orthogonal subcarrier generator 430 coupled with an output of the frequency selector 620 and configured to:

receive the first part of the subcarrier specifications;

translate the first part of the subcarrier specifications from a first domain to a second domain; and generate a baseband real signal (a BB Re signal) and a baseband imaginary signal (a BB Im signal) that include the first part of the N subcarriers;

a second-level modulator 440 coupled with an output of the orthogonal subcarrier generator 430 and configured to receive the BB Re signal and the BB Im signal and to multiply the BB Re signal with an in-phase intermediate-frequency sine wave (an IF sine wave) and to multiply the BB Im signal with a quadrature intermediate-frequency cosine wave (an IF cosine wave) to obtain an IF I signal and an IF Q signal; and a beamformer 460 coupled with an output of the second-level modulator 440 and configured to receive the IF I signal and the IF Q signal and to, for Ma antenna channels, modify a phase and/or an amplitude of the IF I signal and/or the IF Q signal to obtain a directed IF I signal and/or a directed IF Q signal, wherein Ma is an integer larger than 1; and a combiner 670 configured to receive Ma output signals from each of the two or more units of data stream/power channel digital path 610, 710 to add each of the Ma output signals, and to pass each of the Ma added output signals to one of Ma antenna channel modules 113 configured to drive an antenna or a sub-antenna in an antenna arrangement 116 and to transmit wireless power based on the power information 114 and broadband data including data bits 112.

Clause 2. The transmitter of clause 1, wherein a unit of data stream/power channel digital path 610 further comprises an SSB prep unit 450 coupled between the second-level modulator 440 and the beamformer 460 and configured to reduce or remove either negative or positive frequency components from the first IF I signal and the first IF Q signal.

Clause 3. The transmitter of clause 1 or clause 2, wherein an antenna channel module 113 includes an RF backend 470.

Clause 4. The transmitter of any of the clauses 1 to 3, wherein a unit of second path 710 comprises a memory 740 configured to store an IF signal related to a subcarrier whose specifications are repeated from a first symbol to a second symbol.

Clause 5. The transmitter of any of the clauses 1 to 4, wherein the data bits have a bandwidth of more than one hundred megabits per second (100 Mbps) and wherein the IF I signal and the IF Q signal occupy a spectrum of at least ten megahertz (10 MHz).

Clause 6. The transmitter of any of the clauses 1 to 5, wherein the first domain is a frequency domain and the second domain is a time domain.

Clause 7. A transmitter, comprising:

a mapper 410 configured to map data bits 112 and power information 114 to N subcarriers to obtain mapped information, wherein N is an integer of at least 1;

two or more units of a data stream/power channel digital path 810 wherein a data stream/power channel digital path 810 includes:

a frequency selector 620 configured to pass on a first part of the mapped information or of subcarrier specifications, related to a first part of the N subcarriers, and to ignore a second part of the mapped information or of the subcarrier specifications;

a first-level modulator 820 configured to receive the mapped information or the first part of the mapped information and to modulate the mapped information or the first part of the mapped information according to a modulation standard to provide the subcarrier specifications or to provide the first part of the subcarrier specifications;

an orthogonal subcarrier generator 430 configured to:

receive the first part of the subcarrier specifications;

translate the first part of the subcarrier specifications from a first domain to a second domain; and generate a baseband real signal (a BB Re signal) and a baseband imaginary signal (a BB Im signal) that include the first part of the N subcarriers;

a second-level modulator 440 coupled with an output of the orthogonal subcarrier generator 430 and configured to receive the BB Re signal and the BB Im signal and to multiply the BB Re signal with an in-phase intermediate-frequency sine wave (an IF sine wave) and to multiply the BB Im signal with a quadrature intermediate-frequency cosine wave (an IF cosine wave) to obtain an IF I signal and an IF Q signal; and a beamformer 460 coupled with an output of the second-level modulator 440 and configured to receive the IF I signal and the IF Q signal and to, for Ma antenna channels, modify a phase and/or an amplitude of the IF I signal and/or the IF Q signal to obtain a directed IF I signal and/or a directed IF Q signal, wherein Ma is an integer of at least 1; and a combiner 670 configured to receive Ma output signals from each of the two or more units of data stream/power channel digital path 810 and to add each of the Ma output signals to obtain Ma added output signals, and to pass each of the Ma added output signals to one of Ma antenna channel modules 113 configured to drive an antenna or a sub-antenna in an antenna arrangement 116 and to transmit wireless power based on the power information 114 and broadband data including data bits 112.

Clause 8. The transmitter of clause 7, wherein a unit of data stream/power channel digital path 610 further comprises an SSB prep unit 450 coupled between the second-level modulator 440 and the beamformer 460 and configured to reduce or remove either negative or positive frequency components from the first IF I signal and the first IF Q signal.

Clause 9. The transmitter of clause 7 or clause 8, wherein an antenna channel module 113 includes an RF backend 470.

Clause 10. The transmitter of any of the clauses 7 to 9, wherein a unit of second path 710 comprises a memory 740 configured to store an IF signal related to a subcarrier whose specifications are repeated from a first symbol to a second symbol.

Clause 11. The transmitter of any of the clauses 7 to 10, wherein the data bits have a bandwidth of more than one hundred megabits per second (100 Mbps) and wherein the IF I signal and the IF Q signal occupy a spectrum of at least ten megahertz (10 MHz).

Clause 12. The transmitter of any of the clauses 7 to 11, wherein the first domain is a frequency domain and the second domain is a time domain.

Clause 13. A transmitter, comprising:

a mapper 410 configured to map data bits 112 and power information 114 to N subcarriers to obtain mapped information, wherein N is an integer of at least 1;

a first-level modulator 420 coupled with an output of the mapper 410 and configured to receive the mapped information and convert the mapped information into subcarrier specifications, wherein a subcarrier specification includes a complex number that defines an amplitude and a phase of a subcarrier;

two or more units of an antenna channel digital path 1010 wherein an antenna channel digital path 1010 includes:

a set of phase rotators 1060 configured to receive the subcarrier specifications and to rotate the subcarrier specifications to obtain rotated subcarrier specifications;

an orthogonal subcarrier generator 430 coupled with outputs of the set of phase rotators 1060 and configured to:

receive the rotated subcarrier specifications;

translate the rotated subcarrier specifications from a first domain to a second domain; and generate a baseband real signal (a BB Re signal) and a baseband imaginary signal (a BB Im signal) that include the rotated subcarriers;

a second-level modulator 440 coupled with an output of the orthogonal subcarrier generator 430 and configured to receive the BB Re signal and the BB Im signal and to multiply the BB Re signal with an in-phase intermediate-frequency sine wave (an IF sine wave) and to multiply the BB Im signal with a quadrature intermediate-frequency cosine wave (an IF cosine wave) to obtain an IF I signal and an IF Q signal; and two or more antenna channel modules 113, each including an RF backend 470 and each configured to drive an antenna or a sub-antenna in an antenna arrangement 116 and to transmit wireless power based on the power information 114 and broadband data including data bits 112.

Clause 14. The transmitter of clause 13, wherein the antenna channel digital path 1010 further comprises an SSB prep unit 450 coupled with the second-level modulator 440 and configured to reduce or remove either negative or positive frequency components from the first IF I signal and the first IF Q signal.

Clause 15. The transmitter of clause 13 or clause 14, wherein the data bits have a bandwidth of more than one hundred megabits per second (100 Mbps) and wherein the IF I signal and the IF Q signal occupy a spectrum of at least ten megahertz (10 MHZ).

Clause 16. A transmitter, comprising:

a mapper 410 configured to map data bits 112 and power information 114 to N subcarriers to obtain mapped information, wherein N is an integer of at least 1;

a first-level modulator 420 coupled with an output of the mapper 410 and configured to receive the mapped information and convert the mapped information into subcarrier specifications, wherein a subcarrier specification includes a complex number that defines an amplitude and a phase of a subcarrier;

two or more units of an antenna channel digital path 1010 wherein an antenna channel digital path 1010 includes:

a set of phase rotators 1060 configured to receive the subcarrier specifications and to rotate the subcarrier specifications to obtain rotated subcarrier specifications;

an orthogonal subcarrier generator 430 coupled with outputs of the set of phase rotators 1060 and configured to:

receive the rotated subcarrier specifications;

translate the rotated subcarrier specifications from a first domain to a second domain; and generate a baseband real signal (a BB Re signal) and a baseband imaginary signal (a BB Im signal) that include the rotated subcarriers;

a second-level modulator 440 coupled with an output of the orthogonal subcarrier generator 430 and configured to receive the BB Re signal and the BB Im signal and to multiply the BB Re signal with an in-phase intermediate-frequency sine wave (an IF sine wave) and to multiply the BB Im signal with a quadrature intermediate-frequency cosine wave (an IF cosine wave) to obtain an IF I signal and an IF Q signal; and two or more antenna channel modules 113, each including an RF backend 470 and each configured to drive an antenna or a sub-antenna in an antenna arrangement 116 and to transmit wireless power based on the power information 114 and broadband data including data bits 112.

Clause 17. The transmitter of clause 16, wherein the antenna channel digital path 1010 further comprises an SSB prep unit 450 coupled with the second-level modulator 440 and configured to reduce or remove either negative or positive frequency components from the first IF I signal and the first IF Q signal.

Clause 18. The transmitter of clause 16, wherein the data bits have a bandwidth of more than one hundred megabits per second (100 Mbps) and wherein the IF I signal and the IF Q signal occupy a spectrum of at least ten megahertz (10 MHZ).

Clause 19. A method for simultaneously transmitting broadband data and wireless power in multiple directions, the method comprising:

associating at least a first part of a first data stream with a first subcarrier to obtain a first mapped data and at least a part of a power information with a second subcarrier to obtain a second mapped data;

in a first-level modulator, using the first mapped data to generate a first subcarrier specification and the second mapped data to generate a second subcarrier specification, wherein the first subcarrier specification and the second subcarrier specification each include a real part and an imaginary part, and wherein the first-level modulator uses a first modulation type for the first subcarrier specification;

in a first data stream/power channel digital path:

selecting the first subcarrier specification, generating the first subcarrier based on the first subcarrier specification, orthogonally modulating the first subcarrier onto an intermediate frequency (IF), and beamforming the modulated first subcarrier for transmission in a first direction via a first antenna and a second antenna; and in a second data stream/power channel digital path:

beamforming a modulated second subcarrier for transmission in a second direction via the first antenna and the second antenna, wherein the modulated second subcarrier is based on the second mapped data.

Clause 20. The method of clause 19, further comprising:

associating a second part of the first data stream with a third subcarrier to obtain a third mapped data;

in the first-level modulator, using the third mapped data to generate a third subcarrier specification; and in the first data stream/power channel digital path:

selecting the third subcarrier specification, generating the third subcarrier based on the third subcarrier specification, orthogonally modulating the third subcarrier onto the IF, and beamforming a modulated third subcarrier for transmission in a third direction via the first antenna and the second antenna.

Clause 21. The method of clause 19 or clause 20, further comprising:

in the first data stream/power channel digital path, using Marple's method to remove one of negative frequencies and positive frequencies from a frequency spectrum of the modulated first subcarrier.

Clause 22. The method of any of the clauses 19 to 21, further comprising:

in the second data stream/power channel digital path, selecting the second subcarrier specification, generating the second subcarrier based on the second subcarrier specification, and modulating the second subcarrier onto the IF to obtain the modulated second subcarrier.

Clause 23. The method of any of the clauses 19 to 21, further comprising:

in the second data stream/power channel digital path, retrieving the modulated second subcarrier from a memory.

Clause 24. A method for simultaneously transmitting broadband data and wireless power in multiple directions and with multiple modulation types, the method comprising:

associating at least a first part of a first data stream with a first subcarrier to obtain a first mapped data, at least a second part of a second data stream with a second subcarrier to obtain a second mapped data, and at least a third part of a power information with a third subcarrier to obtain a third mapped data;

in a first data stream/power channel digital path:

selecting the first mapped data, using the first mapped data to generate a first subcarrier specification based on a first modulation type, generating the first subcarrier based on the first subcarrier specification, modulating the first subcarrier onto an intermediate frequency (IF), and beamforming the modulated first subcarrier for transmission in a first direction via a first antenna and a second antenna;

in a second data stream/power channel digital path:

selecting the second mapped data, using the second mapped data to generate a second subcarrier specification based on a second modulation type, generating the second subcarrier based on the second subcarrier specification, modulating the second subcarrier onto the IF, and beamforming the modulated second subcarrier for transmission in a second direction via the first antenna and the second antenna; and in a third data stream/power channel digital path:

beamforming a modulated third subcarrier for transmission in a third direction via the first antenna and the second antenna, wherein the modulated third subcarrier is based on the third mapped data.

Clause 25. The method of clause 24, further comprising:

in the first data stream/power channel digital path, using Marple's method to remove one of negative frequencies and positive frequencies from a frequency spectrum of the modulated first subcarrier; and in the second data stream/power channel digital path, using Marple's method to remove one of negative frequencies and positive frequencies from a frequency spectrum of the modulated second subcarrier.

Clause 26. The method of clause 24 or clause 25, further comprising:

in the third data stream/power channel digital path, selecting the third subcarrier specification, generating the third subcarrier based on the third subcarrier specification, and modulating the third subcarrier onto the IF to obtain the modulated third subcarrier.

Clause 27. The method of any of the clauses 24 to 26, further comprising:

in the third data stream/power channel digital path, retrieving the modulated third subcarrier from a memory.

Clause 28. A method for simultaneously transmitting multiple data streams and wireless power in multiple directions from any number of antennas, comprising:

associating at least a first part of a first data stream with a first subcarrier to obtain a first mapped data, at least a second part of a second data stream with a second subcarrier to obtain a second mapped data, and at least a third part of a power information with a third subcarrier to obtain a third mapped data;

in a first-level modulator, using the first mapped data to generate a first subcarrier specification, the second mapped data to generate a second subcarrier specification, and the third mapped data to generate a third subcarrier specification, wherein the first subcarrier specification, the second subcarrier specification, and the third subcarrier specification each include a real part and an imaginary part;

in a first data stream/power channel digital path:

phase rotating the first subcarrier specification for transmission on a first antenna in the first direction to obtain a first phase-rotated first subcarrier specification, phase rotating the second subcarrier specification for transmission on the first antenna in a second direction to obtain a first phase-rotated second subcarrier specification, and phase rotating the third subcarrier specification for transmission on the first antenna in a third direction to obtain a first phase-rotated third subcarrier specification;

generating a first-antenna first subcarrier, a first-antenna second subcarrier, and a first-antenna third subcarrier based on the first phase-rotated first subcarrier specification, the first phase-rotated second subcarrier specification, and the first phase-rotated third subcarrier specification;

modulating the first-antenna first subcarrier, the first-antenna second subcarrier and the first-antenna third subcarrier onto an intermediate frequency (IF) to generate a first antenna IF signal; and forwarding the first antenna IF signal to a first antenna channel module for transmission on the first antenna;

in a second data stream/power channel digital path:

phase rotating the first subcarrier specification for transmission on a second antenna in the first direction to obtain a second phase-rotated first subcarrier specification, phase rotating the second subcarrier specification for transmission on the second antenna in the second direction to obtain a second phase-rotated second subcarrier specification, and phase rotating the third subcarrier specification for transmission on the second antenna in the third direction to obtain a second phase-rotated third subcarrier specification;

generating a second-antenna first subcarrier, a second-antenna second subcarrier, and a second-antenna third subcarrier based on the second phase-rotated first subcarrier specification, the second phase-rotated second subcarrier specification, and the second phase-rotated third subcarrier specification;

modulating the second-antenna first subcarrier, the second-antenna second subcarrier and the second-antenna third subcarrier onto the IF to generate a second antenna IF signal; and forwarding the second antenna IF signal to a second antenna channel module for transmission on the second antenna; and in a third data stream/power channel digital path:

phase rotating the first subcarrier specification for transmission on a third antenna in the first direction to obtain a third phase-rotated first subcarrier specification, phase rotating the second subcarrier specification for transmission on the third antenna in the second direction to obtain a third phase-rotated second subcarrier specification, and phase rotating the third subcarrier specification for transmission on the third antenna in the third direction to obtain a third phase-rotated third subcarrier specification;

generating a third-antenna first subcarrier, a third-antenna second subcarrier, and a third-antenna third subcarrier based on the third phase-rotated first subcarrier specification, the third phase-rotated second subcarrier specification, and the third phase-rotated third subcarrier specification;

modulating the third-antenna first subcarrier, the third-antenna second subcarrier and the third-antenna third subcarrier onto the IF to generate a third antenna IF signal; and forwarding the third antenna IF signal to a third antenna channel module for transmission on the third antenna.

Clause 29. The method of clause 28, further comprising:

in the first data stream/power channel digital path, using Marple's method to remove one of negative frequencies and positive frequencies from a frequency spectrum of the first antenna IF signal;

in the second data stream/power channel digital path, using Marple's method to remove one of negative frequencies and positive frequencies from a frequency spectrum of the second antenna IF signal; and in the third data stream/power channel digital path, using Marple's method to remove one of negative frequencies and positive frequencies from a frequency spectrum of the third antenna IF signal.

Considerations

We describe various implementations of systems and methods to transmit a combination of broadband data and harvestable power in one or more targeted directions.

The technology disclosed can be practiced as a system, apparatus, or method. One or more features of an implementation can be combined with a base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to specific implementations thereof, these specific implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above. For example, many of the individual functions described are well known in the art, and many different and improved implementations of these functions exist that all fall within the ambit and scope of the disclosed technology. The functions can be implemented as analog circuits on an IC, module, or printed circuit board (PCB), mixed-signal circuits on an IC, module, or PCB, digital circuits on an IC, module, or PCB, configurations of a field-programmable gate array (FPGA), firmware for optimized digital signal processors (DSPs), or software for general-purpose processors. Implementations may be as a single chip, or as a multi-chip module (MCM) packaging multiple semiconductor dies in a single package. All such variations and modifications are to be considered within the ambit of the disclosed technology, the nature of which is to be determined from the foregoing description.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Any suitable technology for manufacturing electronic devices can be used to implement the circuits of specific implementations, including CMOS, FinFET, GAAFET, BICMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different specific implementations. In some specific implementations, multiple elements, devices, or circuits shown as sequential in this specification can be operating in parallel.

It will also be appreciated that one or more of the elements depicted in the drawings/figures can also be implemented in a more separated or integrated manner, or even removed or rendered as inoperable in certain cases, as is useful in accordance with a particular application.

Thus, while specific implementations have been described herein, latitudes of modification, various changes, and substitutions are intended in the foregoing disclosures, and it will be appreciated that in some instances some features of specific implementations will be employed without a corresponding use of other features without departing from the scope and spirit as set forth. Therefore, many modifications may be made to adapt a particular situation or material to the essential scope and spirit.

The invention claimed is:

1. A transmitter, comprising:
a mapper configured to map data bits and/or power information to N subcarriers to obtain mapped information, wherein N is an integer of at least 1;
a first-level modulator coupled with an output of the mapper and configured to receive the mapped information and convert the mapped information into subcarrier specifications, wherein a subcarrier specification includes a complex number that defines an amplitude and a phase of a subcarrier;
two or more units of a data stream/power channel digital path each including:
a frequency selector configured to pass on a first part of the subcarrier specifications related to a first part of the N subcarriers and to ignore a second part of the subcarrier specifications;
an orthogonal subcarrier generator coupled with an output of the frequency selector and configured to:
receive the first part of the subcarrier specifications;
translate the first part of the subcarrier specifications from a first domain to a second domain; and
generate a baseband real signal (a BB Re signal) and a baseband imaginary signal (a BB Im signal) that include the first part of the N subcarriers;
a second-level modulator coupled with an output of the orthogonal subcarrier generator and configured to receive the BB Re signal and the BB Im signal and to multiply the BB Re signal with an in-phase intermediate-frequency sine wave (an IF sine wave) and to multiply the BB Im signal with a quadrature intermediate-frequency cosine wave (an IF cosine wave) to obtain an IF I signal and an IF Q signal; and
a beamformer coupled with an output of the second-level modulator and configured to receive the IF I signal and the IF Q signal and to, for $M_a$ antenna channels, modify a phase and/or an amplitude of the IF I signal and/or the IF Q signal to obtain a directed IF I signal and/or a directed IF Q signal, wherein $M_a$ is an integer of at least 1; and
a combiner configured to receive $M_a$ output signals from each of the two or more units of data stream/power channel digital path, to add each of the $M_a$ output signals, and to pass each of the $M_a$ added output signals to one of $M_a$ antenna channel modules configured to drive an antenna or a sub-antenna in an antenna arrangement and to transmit wireless power based on the power information and broadband data including data bits.

2. The transmitter of claim 1, wherein a unit of data stream/power channel digital path further comprises an SSB prep unit coupled between the second-level modulator and the beamformer and configured to reduce or remove either negative or positive frequency components from the IF I signal and the IF Q signal.

3. The transmitter of claim 1, wherein an antenna channel module includes an RF backend.

4. The transmitter of claim 1, wherein a unit of second path comprises a memory configured to store an IF signal related to a subcarrier whose specifications are repeated from a first symbol to a second symbol.

5. The transmitter of claim 1, wherein the data bits have a bandwidth of more than one hundred megabits per second (100 Mbps) and wherein the IF I signal and the IF Q signal occupy a spectrum of at least ten megahertz (10 MHz).

6. The transmitter of claim 1, wherein the first domain is a frequency domain and the second domain is a time domain.

7. A transmitter, comprising:
a mapper configured to map data bits and power information to N subcarriers to obtain mapped information, wherein N is an integer of at least 1;
two or more units of a data stream/power channel digital path wherein a data stream/power channel digital path includes:
a frequency selector configured to pass on a first part of the mapped information or of subcarrier specifications, related to a first part of the N subcarriers, and to ignore a second part of the mapped information or of the subcarrier specifications;
a first-level modulator configured to receive the mapped information or the first part of the mapped information and to modulate the mapped information or the first part of the mapped information according to a modulation standard to provide the subcarrier specifications or to provide the first part of the subcarrier specifications;
an orthogonal subcarrier generator configured to:
receive the first part of the subcarrier specifications;
translate the first part of the subcarrier specifications from a first domain to a second domain; and
generate a baseband real signal (a BB Re signal) and a baseband imaginary signal (a BB Im signal) that include the first part of the N subcarriers;
a second-level modulator coupled with an output of the orthogonal subcarrier generator and configured to receive the BB Re signal and the BB Im signal and to multiply the BB Re signal with an in-phase intermediate-frequency sine wave (an IF sine wave) and to multiply the BB Im signal with a quadrature intermediate-frequency cosine wave (an IF cosine wave) to obtain an IF I signal and an IF Q signal; and
a beamformer coupled with an output of the second-level modulator and configured to receive the IF I signal and the IF Q signal and to, for $M_a$ antenna channels, modify a phase and/or an amplitude of the IF I signal and/or the IF Q signal to obtain a directed IF I signal and/or a directed IF Q signal, wherein $M_a$ is an integer of at least 1; and a combiner configured to receive $M_a$ output signals from each of the two or more units of data stream/power channel digital path and to add each of the $M_a$ output signals to obtain $M_a$ added output signals, and to pass each of the $M_a$ added output signals to one of $M_a$ antenna channel modules configured to drive an antenna or a sub-antenna in an antenna arrangement and to transmit wireless power based on the power information and broadband data including data bits.

8. The transmitter of claim 7, wherein a unit of data stream/power channel digital path further comprises an SSB prep unit coupled between the second-level modulator and the beamformer and configured to reduce or remove either negative or positive frequency components from the IF I signal and the IF Q signal.

9. The transmitter of claim 7, wherein an antenna channel module includes an RF backend.

10. The transmitter of claim 7, wherein a unit of second path comprises a memory configured to store an IF signal related to a subcarrier whose specifications are repeated from a first symbol to a second symbol.

11. The transmitter of claim 7, wherein the data bits have a bandwidth of more than one hundred megabits per second (100 Mbps) and wherein the IF I signal and the IF Q signal occupy a spectrum of at least ten megahertz (10 MHz).

12. The transmitter of claim 7, wherein the first domain is a frequency domain and the second domain is a time domain.

13. A method for simultaneously transmitting broadband data and wireless power in multiple directions, the method comprising:
  associating at least a first part of a first data stream with a first subcarrier to obtain a first mapped data and at least a part of a power information with a second subcarrier to obtain a second mapped data;
  in a first-level modulator, using the first mapped data to generate a first subcarrier specification and the second mapped data to generate a second subcarrier specification, wherein the first subcarrier specification and the second subcarrier specification each include a real part and an imaginary part, and wherein the first-level modulator uses a first modulation type for the first subcarrier specification;
  in a first data stream/power channel digital path:
    selecting the first subcarrier specification, generating the first subcarrier based on the first subcarrier specification, modulating the first subcarrier onto an intermediate frequency (IF), and beamforming the modulated first subcarrier for transmission in a first direction via a first antenna and a second antenna; and
  in a second data stream/power channel digital path:
    beamforming a modulated second subcarrier for transmission in a second direction via the first antenna and the second antenna, wherein the modulated second subcarrier is based on the second mapped data.

14. The method of claim 13, further comprising:
  associating a second part of the first data stream with a third subcarrier to obtain a third mapped data;
  in the first-level modulator, using the third mapped data to generate a third subcarrier specification; and
  in the first data stream/power channel digital path:
    selecting the third subcarrier specification, generating the third subcarrier based on the third subcarrier specification, modulating the third subcarrier onto the IF, and beamforming the modulated third subcarrier for transmission in a third direction via the first antenna and the second antenna.

15. The method of claim 13, further comprising:
  in the first data stream/power channel digital path, using Marple's method to remove one of negative frequencies and positive frequencies from a frequency spectrum of the modulated first subcarrier.

16. The method of claim 13, further comprising:
  in the second data stream/power channel digital path, selecting the second subcarrier specification, generating the second subcarrier based on the second subcarrier specification, and modulating the second subcarrier onto the IF to obtain the modulated second subcarrier.

17. The method of claim 13, further comprising:
  in the second data stream/power channel digital path, retrieving the modulated second subcarrier from a memory.

18. The method of claim 13, further comprising:
  adding the beamformed and modulated first subcarrier to the beamformed and modulated second subcarrier for transmission on a first antenna or a first sub-antenna in an antenna arrangement.

19. A method for simultaneously transmitting broadband data and wireless power in multiple directions and with multiple modulation types, the method comprising:
  associating at least a first part of a first data stream with a first subcarrier to obtain a first mapped data, at least a second part of a second data stream with a second subcarrier to obtain a second mapped data, and at least a third part of a power information with a third subcarrier to obtain a third mapped data;
  in a first data stream/power channel digital path:
    selecting the first mapped data, using the first mapped data to generate a first subcarrier specification based on a first modulation type, generating the first subcarrier based on the first subcarrier specification, modulating the first subcarrier onto an intermediate frequency (IF), and beamforming the modulated first subcarrier for transmission in a first direction via a first antenna and a second antenna;
  in a second data stream/power channel digital path:
    selecting the second mapped data, using the second mapped data to generate a second subcarrier specification based on a second modulation type, generating the second subcarrier based on the second subcarrier specification, modulating the second subcarrier onto the IF, and beamforming the modulated second subcarrier for transmission in a second direction via the first antenna and the second antenna; and
  in a third data stream/power channel digital path:
    beamforming a modulated third subcarrier for transmission in a third direction via the first antenna and the second antenna, wherein the modulated third subcarrier is based on the third mapped data.

20. The method of claim 19, further comprising:
  in the first data stream/power channel digital path, using Marple's method to remove one of negative frequencies and positive frequencies from a frequency spectrum of the modulated first subcarrier; and
  in the first data stream/power channel digital path, using Marple's method to remove one of negative frequencies and positive frequencies from a frequency spectrum of the modulated second subcarrier.

21. The method of claim 19, further comprising:
  in the third data stream/power channel digital path, selecting the third subcarrier specification, generating the third subcarrier based on the third subcarrier specification, and modulating the third subcarrier onto the IF to obtain the modulated third subcarrier.

22. The method of claim 19, further comprising:

in the third data stream/power channel digital path, retrieving the modulated third subcarrier from a memory.

23. The method of claim 19, further comprising:

adding the beamformed and modulated first subcarrier, the beamformed and modulated second subcarrier, and the beamformed and modulated third subcarrier for transmission on a first antenna or a first sub-antenna in an antenna arrangement.

\* \* \* \* \*